United States Patent
Abbott et al.

(10) Patent No.: US 11,145,424 B2
(45) Date of Patent: Oct. 12, 2021

(54) DIRECT HEAT EXCHANGER FOR MOLTEN CHLORIDE FAST REACTOR

(71) Applicant: TerraPower, LLC, Bellevue, WA (US)

(72) Inventors: Ryan Abbott, Woodinville, WA (US); Anselmo T. Cisneros, Seattle, WA (US); Kevin Kramer, Redmond, WA (US); James A. Roecker, Bellevue, WA (US); Daniel J. Walter, North Bend, WA (US); Kent E. Wardle, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 267 days.

(21) Appl. No.: 16/264,112

(22) Filed: Jan. 31, 2019

(65) Prior Publication Data

US 2019/0237205 A1    Aug. 1, 2019

Related U.S. Application Data

(60) Provisional application No. 62/624,646, filed on Jan. 31, 2018.

(51) Int. Cl.
*G21C 1/32* (2006.01)
*G21C 3/44* (2006.01)
(Continued)

(52) U.S. Cl.
CPC .............. *G21C 3/44* (2013.01); *F22B 37/00* (2013.01); *G21C 1/03* (2013.01); *G21C 1/22* (2013.01);
(Continued)

(58) Field of Classification Search
CPC ... G21C 1/02; G21C 1/22; G21C 1/32; G21C 5/02; G21C 5/12; G21C 5/18
See application file for complete search history.

(56) References Cited

U.S. PATENT DOCUMENTS

| 2,375,009 A | 5/1945 | Lepsoe |
| 2,874,106 A | 2/1959 | Hammond et al. |

(Continued)

FOREIGN PATENT DOCUMENTS

| CA | 631890 A | 11/1961 |
| CN | 107112055 | 9/2020 |

(Continued)

OTHER PUBLICATIONS

PCT International Preliminary Report on Patentability in International Application PCT/US2019/015967, dated Aug. 13, 2020, 16 pages.

(Continued)

*Primary Examiner* — Jack W Keith
*Assistant Examiner* — Joshua C Devorkin

(57) ABSTRACT

A molten chloride fast reactor (MCFR) includes a plurality of reflectors defining a central core having a core geometric center. A flow channel fluidically connected to the central core. The flow channel includes an outlet flow channel downstream of the central core and an inlet flow channel upstream from the central core. A primary heat exchanger (PHX) disposed outside the central core and between the outlet flow channel and the inlet flow channel. The MCFR also includes a decay heat heat exchanger (DHHX). At least a portion of the DHHX is disposed above the core geometric center, and a fuel salt is configured to circulate at least partially through the outlet flow channel, the DHHX, the PHX, the inlet flow channel, and the central core.

13 Claims, 16 Drawing Sheets

(51) Int. Cl.
| | |
|---|---|
| *G21C 19/04* | (2006.01) |
| *G21C 1/22* | (2006.01) |
| *G21C 7/30* | (2006.01) |
| *G21C 19/28* | (2006.01) |
| *F22B 37/00* | (2006.01) |
| *G21C 1/03* | (2006.01) |
| *G21C 15/18* | (2006.01) |
| *G21C 3/54* | (2006.01) |
| *G21D 1/00* | (2006.01) |
| *G21D 1/04* | (2006.01) |
| *G21C 11/06* | (2006.01) |

(52) U.S. Cl.
CPC ............... *G21C 1/326* (2013.01); *G21C 3/54* (2013.01); *G21C 7/30* (2013.01); *G21C 15/18* (2013.01); *G21C 19/04* (2013.01); *G21C 19/28* (2013.01); *G21D 1/006* (2013.01); *G21C 11/06* (2013.01); *G21D 1/04* (2013.01)

(56) References Cited

U.S. PATENT DOCUMENTS

| | | | |
|---|---|---|---|
| 2,920,024 | A | 1/1960 | Barton et al. |
| 2,945,794 | A | 7/1960 | Winters et al. |
| 3,018,239 | A | 1/1962 | Happell |
| 3,029,130 | A | 4/1962 | Moore |
| 3,046,212 | A | 7/1962 | Anderson |
| 3,136,700 | A | 6/1964 | Poppendiek et al. |
| 3,216,901 | A | 11/1965 | Teitel |
| 3,218,160 | A | 11/1965 | Knighton et al. |
| 3,262,856 | A | 7/1966 | Bettis |
| 3,287,225 | A | 11/1966 | Ackroyd et al. |
| 3,383,285 | A | 5/1968 | Ackroyd et al. |
| 3,450,198 | A | 6/1969 | Brunner |
| 3,785,924 | A | 1/1974 | Notari |
| 3,909,351 | A | 9/1975 | Tilliette |
| 3,996,099 | A | 12/1976 | Faugeras |
| 3,997,413 | A | 12/1976 | Fougner |
| 4,039,377 | A | 8/1977 | Andrieu |
| 4,045,286 | A | 8/1977 | Blum |
| 4,056,435 | A | 11/1977 | Carlier |
| 4,216,821 | A | 8/1980 | Robin |
| 4,342,721 | A | 8/1982 | Pomie |
| 4,397,778 | A | 8/1983 | Lloyd |
| 4,762,667 | A | 8/1988 | Sharbaugh |
| 5,185,120 | A | 2/1993 | Fennern |
| 5,196,159 | A | 3/1993 | Kawashima |
| 5,223,210 | A | 6/1993 | Hunsbedt |
| 5,380,406 | A | 1/1995 | Horton |
| 5,421,855 | A | 6/1995 | Hayden |
| 6,181,759 | B1 | 1/2001 | Heibel |
| 7,217,402 | B1 | 5/2007 | Miller |
| 8,416,908 | B2 | 4/2013 | Mann |
| 8,594,268 | B2 | 11/2013 | Shu |
| 8,734,738 | B1 | 5/2014 | Herrmann |
| 9,171,646 | B2 | 10/2015 | Moses et al. |
| 10,043,594 | B2 | 8/2018 | Scott |
| 10,438,705 | B2 | 10/2019 | Cheatham |
| 10,497,479 | B2 | 12/2019 | Abbott et al. |
| 10,734,122 | B2 | 8/2020 | Cisneros et al. |
| 2004/0114703 | A1 | 6/2004 | Bolton |
| 2005/0220251 | A1 | 10/2005 | Yokoyama |
| 2008/0310575 | A1 | 12/2008 | Cinotti |
| 2011/0222642 | A1* | 9/2011 | Gautier ............... G21C 1/02 376/395 |
| 2011/0286563 | A1 | 11/2011 | Moses |
| 2012/0051481 | A1 | 3/2012 | Shu |
| 2012/0056125 | A1 | 3/2012 | Raade |
| 2012/0183112 | A1 | 7/2012 | Leblanc |
| 2012/0288048 | A1 | 11/2012 | Mann |
| 2012/0314829 | A1 | 12/2012 | Greene |
| 2013/0083878 | A1 | 4/2013 | Massie |
| 2013/0180520 | A1 | 7/2013 | Raade |
| 2013/0272470 | A1 | 10/2013 | Whitten et al. |
| 2014/0166924 | A1 | 6/2014 | Raade |
| 2014/0348287 | A1 | 11/2014 | Huke et al. |
| 2015/0010875 | A1 | 1/2015 | Raade |
| 2015/0117589 | A1 | 1/2015 | Kamei |
| 2015/0036779 | A1* | 2/2015 | Leblanc ............... G21C 1/322 376/207 |
| 2015/0078504 | A1 | 3/2015 | Woolley |
| 2015/0170766 | A1 | 6/2015 | Singh et al. |
| 2015/0228363 | A1 | 8/2015 | Dewan |
| 2015/0243376 | A1 | 8/2015 | Wilson |
| 2015/0357056 | A1 | 12/2015 | Shayer |
| 2016/0005497 | A1 | 1/2016 | Scott |
| 2016/0189806 | A1 | 6/2016 | Cheatham, III et al. |
| 2016/0189812 | A1 | 6/2016 | Czerwinski |
| 2016/0189813 | A1 | 6/2016 | Cisneros |
| 2016/0196885 | A1 | 7/2016 | Singh |
| 2016/0217874 | A1 | 7/2016 | Dewan |
| 2016/0260505 | A1 | 9/2016 | Cadell et al. |
| 2016/0260509 | A1 | 9/2016 | Kim et al. |
| 2017/0084355 | A1 | 3/2017 | Scott |
| 2017/0092381 | A1 | 3/2017 | Cisneros |
| 2017/0117065 | A1 | 4/2017 | Scott |
| 2017/0213610 | A1 | 7/2017 | Sumita et al. |
| 2017/0301413 | A1 | 10/2017 | Cisneros |
| 2017/0301421 | A1 | 10/2017 | Abbott |
| 2017/0316840 | A1 | 11/2017 | Abbott |
| 2017/0316841 | A1 | 11/2017 | Abbott et al. |
| 2018/0019025 | A1 | 1/2018 | Abbott |
| 2018/0047467 | A1 | 2/2018 | Czerwinski |
| 2018/0068750 | A1 | 3/2018 | Cisneros |
| 2018/0137944 | A1 | 5/2018 | Abbott |
| 2018/0277260 | A1 | 9/2018 | Marcille et al. |
| 2019/0311816 | A1 | 10/2019 | Sumita et al. |
| 2020/0027590 | A1 | 1/2020 | Cisneros |
| 2020/0118698 | A1 | 4/2020 | Cheatham |
| 2020/0122109 | A1 | 4/2020 | Kruizenga |
| 2020/0185114 | A1 | 6/2020 | Abbott |

FOREIGN PATENT DOCUMENTS

| | | |
|---|---|---|
| DE | 1112791 | 8/1961 |
| DE | 1439107 | 2/1969 |
| EP | 0617430 | 9/1994 |
| FR | 2296248 | 7/1976 |
| GB | 739968 | 11/1955 |
| GB | 835266 | 5/1960 |
| GB | 964841 | 7/1964 |
| GB | 2073938 | 10/1981 |
| GB | 2508537 | 12/2014 |
| JP | S57 1991 | 1/1982 |
| JP | 1991282397 | 12/1991 |
| JP | 2001-133572 | 5/2001 |
| JP | 2014-119429 | 6/2014 |
| JP | 2014534413 | 12/2014 |
| JP | 2015510588 | 4/2015 |
| RU | 57040 U1 | 9/2006 |
| RU | 2424587 C1 | 7/2011 |
| WO | WO 2013/116942 | 8/2013 |
| WO | WO 2014/0128457 | 8/2014 |
| WO | 2014/196338 | 12/2014 |
| WO | WO 2013/180029 | 5/2015 |
| WO | WO 2014/074930 | 5/2015 |
| WO | WO 2015/140495 | 9/2015 |
| WO | WO 2016/109565 | 7/2016 |
| WO | 2018013317 | 1/2018 |

OTHER PUBLICATIONS

PCT International Preliminary Report on Patentability in International Application PCT/US2019/021791, dated Sep. 24, 2020, 9 pages.

International Search Report/Written Opinion of PCT/US2019/015967, dated Jun. 12, 2019, 25 pages.

Clarno, K.T. et al., "Trade studies for the liquid-salt-cooled very high-temperature reactor: fiscal year 2006 progress report", ORNL/TM-2006 140 (2007), 35 pgs.

(56) References Cited

OTHER PUBLICATIONS

Kimura, "Neutron spectrum in small iron pile surrounded by lead reflector", Journal of Nucear Science and Technology 15, No. 3 (1978): 183-191.
PCT International Search Report and Written Opinion in International Application PCT/US2019/051345, dated Mar. 5, 2020, 15 pages.
Wang, Jun-Wei et al., "Influence of MgC12content on corrosion behavior of GH1140 in molten naCl—MgC12as thermal storage medium", Solar Energy Materials and Solar Cells, Elsevier Science Pub., Amsterdam, NL, vol. 179, Nov. 20, 2017, pp. 194-201.
Holcomb, et al. "Fast Spectrum Molten Salt Reactor Options", Jul. 2011, 46 pages. Available at: http://info.ornl.gov/sites/publications/files/Pub29596.pdf.
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
PCT International Search Report and Written Opinion in International Application PCT/US2016/055001, dated Jan. 25, 2017, 11 pages.
Mourogov et al., Potentialities of the fast spectrum molten salt reactor concept: REBUS-3700, Energy Conversion and Management, Mar. 30, 2006, vol. 47, No. 17, pp. 2761-2771.
PCT International Search Report and Written Opinion in International Application PCT/US2017/030666 dated Jul. 20, 2017, 11 pages.
Abbott et al, Thermal and Mechanical Design Aspects of the LIFE Engine, Fusion Science and Technology Dec. 2008; 56(2), 7 pages.
Harder, et al. "Compatibility and Processing Problems in the Use of Molten Uranium Chloride-Alkali Chloride Mixtures as Reactor Fuels", UKAEA, Atomic Energy Research Establishment, Harwell, England, 1969, 28 pages.
PCT International Preliminary Report on Patentability in International Application PCT/US2017/030666 dated Nov. 6, 2018, 9 pages.
PCT International Preliminary Report on Patentability in International Application PCT/US2016/055001, dated Apr. 12, 2018, 9 pages.
Donnelly et al., Fabrication of Heat Exchanger Tube Bundle for the Molten-Salt Reactor Experiment, ORNL-3500, Dec. 9, 1963, 42 pgs.
PCT International Preliminary Report on Patentability in International Application PCT/US2017/030455, dated Nov. 6, 2018, 17 pages.
PCT International Preliminary Report on Patentability in International Application PCT/US2017/030457, dated Nov. 15, 2018, 15 pages.
PCT International Search Report and Written Opinion in International Application PCT/US2017/030455, dated Jan. 30, 2018, 23 pages.
PCT International Search Report and Written Opinion in International Application PCT/US2017/030457, dated Jan. 23, 2018, 20 pages.
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
ASTM International, Designation: B898-11, Standard Specification for Reactive and Refractory Metal Clad Plate (Sep. 2011), 15 pages.
Cohen et al., "Vanadium-Lined HT9 Cladding Tubes", Argonne National Lab ANL/ET/CP-80384, (Feb. 1994), 12 pgs.
European Extended Search Report for EP 15876187.4 dated Sep. 11, 2018, 10 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.

Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter", AIP Cont. Proc. 694, 403 (2003), 9 pages.
Gen IV International Forum, Molten Salt Reactor (MSR), https://www.gen-4.org/gif/jcms/c_9359/msr, accessed Feb. 26, 2016, 3 pgs.
Grimes, W.R., "Molten-Salt Reactor Chemistry" Nucl. Appl. Technol. 8(137) (1970), 19 pgs.
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, Aug. 1969.
Merle-Lucotte, E., Introduction to the Physics of the Molten Salt Fast Reactor, Thorium Energy Conference 2013 (ThEC13), 2013, 82 pgs.
MSR-FUJI General Information, Technical Features, and Operating Characteristics., pp. 1-30.
Ottewitte, E. H., Cursory First Look at the Molten Chloride Fast Reactor as an Alternative to the Conventional BATR Concept, 1992, 75 pgs.
PCT International Search Report and Written Opinion in International Application No. PCT/US2017/030672, dated Sep. 27, 2017, 9 pages.
PCT International Search Report and Written Opinion in International Application PCT/US2015/067905 dated Aug. 5, 2016, 18 pages.
PCT International Search Report and Written Opinion in International Application PCT/US2015/067923, dated Apr. 19, 2016, 10 pages.
Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.
Scott, Ian and Durham John, The Simple Molten Salt Reactor, Practical, safe and cheap, Moltex Energy LLP presentation slides, 19 pgs.
Scott, Ian, Safer, cheaper nuclear: The simple molten salt reactor (Dec. 2, 2014), http://www.ee.co.za/article/safer-cheaper-nuclear-simple-molten-salt-reactor.hlml, 10 pgs.
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971, 151 pages.
TransAtomic Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Xu et al., Thorium Energy R&D in China, THEO13, CERN, Oct. 28, 2013, 59 pgs.
Molten Salt Reactor (MSR) Review: Feasibility Study of developing a pilot scale molten salt reactor in the UK, Jul. 2015, Energy Process Development, LTD., www.energyprocessdevelopments.com, 75 pgs.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.
PCT International Search Report and Written Opinion in International Application PCT/US2017/061843, dated Oct. 29, 2018, 23 pages.

(56) References Cited

OTHER PUBLICATIONS

PCT International Preliminary Report on Patentability in International Application PCT/US2017/061843, dated May 21, 2019, 13 pages.
PCT International Search Report and Written Opinion in International Application PCT/US2017/038806, dated Oct. 16, 2017, 13 pgs.
PCT International Preliminary Report on Patentability in International Application PCT/US2017/038806, dated Jan. 15, 2019, 7 pgs.
Maltsev et al., "Redox potentials of uranium in molten eutectic mixture of lithium, potassium, and cesium chlorides", Russian Metallurgy, Maiknauka-Interperidica, RU, vol. 2016, No. 8, Dec. 2016, 2 pgs.
Kuznetsov et al., "Electrochemical Behavior and Some Thermodynamic Properties of UCl [sub 4] and UCl [sub 3] Dissolved in a LiCl—KCl Eutectic Melt", Journal of the Electrochemical Society, vol. 152, No. 4, Jan. 2005, 11 pgs.
PCT International Search Report and Written Opinion in International Application PCT/US2017/046139, dated Jan. 17, 2018, 16 pages.
PCT International Preliminary Report on Patentability in International Application PCT/US2017/046139, dated Feb. 12, 2019, 8 pages.

PCT International Search Report and Written Opinion in International Application PCT/US2019/021791, dated Nov. 19, 2019, 15 pages.
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.
Rouch et al, Preliminary thermal-hydraulic core design of the Molten Salt Fast Reactor (MSFR), Annals of Nuclear Energy 64 (2014) 449-456.
Yamaji et al., Experimental and numerical thermal-hydraulics investigation of a molten salt reactor concept core, Kerntechnik 82 (2017) 4.
Yamaji et al., Experimental investigation of the MSFR molten salt reactor concept, Kerntechnik 79 (2014) 5, pp. 408-416.
Yamaji et al., Experimental Modelling and Numerical Analysis of a Molten Salt Fast Reactor, PHYSOR 2014—The Role of Reactor Physics Toward a Sustainable Future, Kyoto, Japan, Sep. 28-Oct. 2, 2014.
Yamaji et al., Thermal-hydraulic analyses and experimental modelling of MSFR, Annals of Nuclear Energy 64 (2014) 457-471.

\* cited by examiner

DIRECT HEAT EXCHANGER FOR MOLTEN CHLORIDE FAST REACTOR

CROSS-REFERENCE TO RELATED APPLICATIONS

The present application claims the benefit of U.S. Provisional Patent Application No. 62/624,646, titled "DIRECT HEAT EXCHANGER FOR MOLTEN CHLORIDE FAST REACTOR," filed Jan. 31, 2018, the entire disclosure of which is incorporated by reference herein.

STATEMENT REGARDING FEDERALLY SPONSORED RESEARCH OR DEVELOPMENT

This invention was made with government support under DE-NE0008473 awarded by The Department of Energy. The government has certain rights in the invention.

INTRODUCTION

The utilization of molten fuels in a nuclear reactor to produce power provides significant advantages as compared to solid fuels. For instance, molten fuel reactors generally provide higher power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts as well as using fluoride salts of thorium. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride fuel salts, and methods and systems for using the fuel salts in a molten fuel reactor. Average operating temperatures of chloride salt reactors are anticipated between 300° C. and 800° C., but could be even higher, e.g., >1000° C.

SUMMARY

Direct reactor auxiliary cooling systems (DRACS) are described below and provide decay heat removal to molten chloride fast reactors (MCFR) to limit temperature increases in the reactor before there is damage to any of the components. The DRACS includes a heat exchanger disposed within the reactor and that is dedicated to the removal of decay heat during a reactor shutdown event. This DRACS heat exchanger is referred to as a decay heat heat exchanger (DHHX) to differentiate from primary heat exchangers (PHX) also used in the reactor.

In one aspect, the technology relates to a MCFR including: a plurality of reflectors defining a central core, wherein the central core includes a core geometric center; a flow channel fluidically connected to the central core, wherein the flow channel includes an outlet flow channel downstream of the central core and an inlet flow channel upstream from the central core; a PHX disposed outside the central core and between the outlet flow channel and the inlet flow channel; and a DHHX, wherein at least a portion of the DHHX is disposed above the core geometric center, and wherein a fuel salt is configured to circulate at least partially through the outlet flow channel, the DHHX, the PHX, the inlet flow channel, and the central core.

In an example, the DHHX is disposed upstream from the PHX. In another example, a pump for circulating the fuel salt is included and the DHHX is disposed upstream from the pump. In yet another example, the pump is disposed upstream from the PHX. In still another example, a flow direction of the fuel salt through the DHHX is different than a flow direction of the fuel salt through the pump. In an example, a flow conditioner is disposed at least partially in the outlet flow channel. In another example, the DHHX includes the flow conditioner.

In yet another example, the DHHX includes a shell and a plurality of tubes. In still another example, the plurality of tubes are disposed substantially parallel to the outlet flow channel. In an example, a cooling circuit including the DHHX is included, wherein a coolant fluid is configured to circulate through the cooling circuit and remove heat from the fuel salt. In another example, the cooling circuit is devoid of a circulating pump. In yet another example, a flow of the coolant fluid through the DHHX is substantially orthogonal to a flow of the fuel salt through the DHHX. In still another example, the cooling circuit is a first cooling circuit, and the MCFR further includes a second cooling circuit including the PHX, the first cooling circuit is independent from the second cooling circuit.

In another aspect, the technology relates to a MCFR including: a vessel including a plurality of structures disposed therein and defining at least one flow channel for circulating fuel salt within the vessel; a core geometric center defined within the vessel; and a DHHX disposed within the vessel and at least partially above the core geometric center.

In an example, the DHHX is coupled in flow communication to at least one cooling circuit that removes heat from the fuel salt. In another example, a PHX is disposed within the vessel, and the DHHX is upstream of the PHX relative the circulation of fuel salt.

In another aspect, the technology relates to a DRACS for a MCFR, the DRACS including: a DHHX disposed within a MCFR reactor vessel and at least partially above a core geometric center, wherein the DHHX includes a shell and a plurality of tubes, and wherein the plurality of tubes receive a flow of fuel salt within the MCFR reactor vessel; and a cooling circuit coupled in flow communication with the shell and configured to circulate a coolant fluid therein.

In an example, a second heat exchanger is coupled in flow communication with the cooling circuit, and the second heat exchanger is positioned at a height that is greater than a height of the DHHX. In another example, the second heat exchanger receives a flow of air to remove heat from the coolant fluid. In yet another example, a flow conditioner is included.

BRIEF DESCRIPTION OF THE DRAWINGS

The following drawing figures, which form a part of this application, are illustrative of described technology and are not meant to limit the scope of the technology as claimed in any manner, which scope shall be based on the claims appended hereto.

DETAILED DESCRIPTION

This disclosure describes various configurations and components of a molten fuel fast or thermal nuclear reactor. For the purposes of this application, embodiments of a molten fuel fast reactor that use a chloride fuel will be described. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

Figure 1:
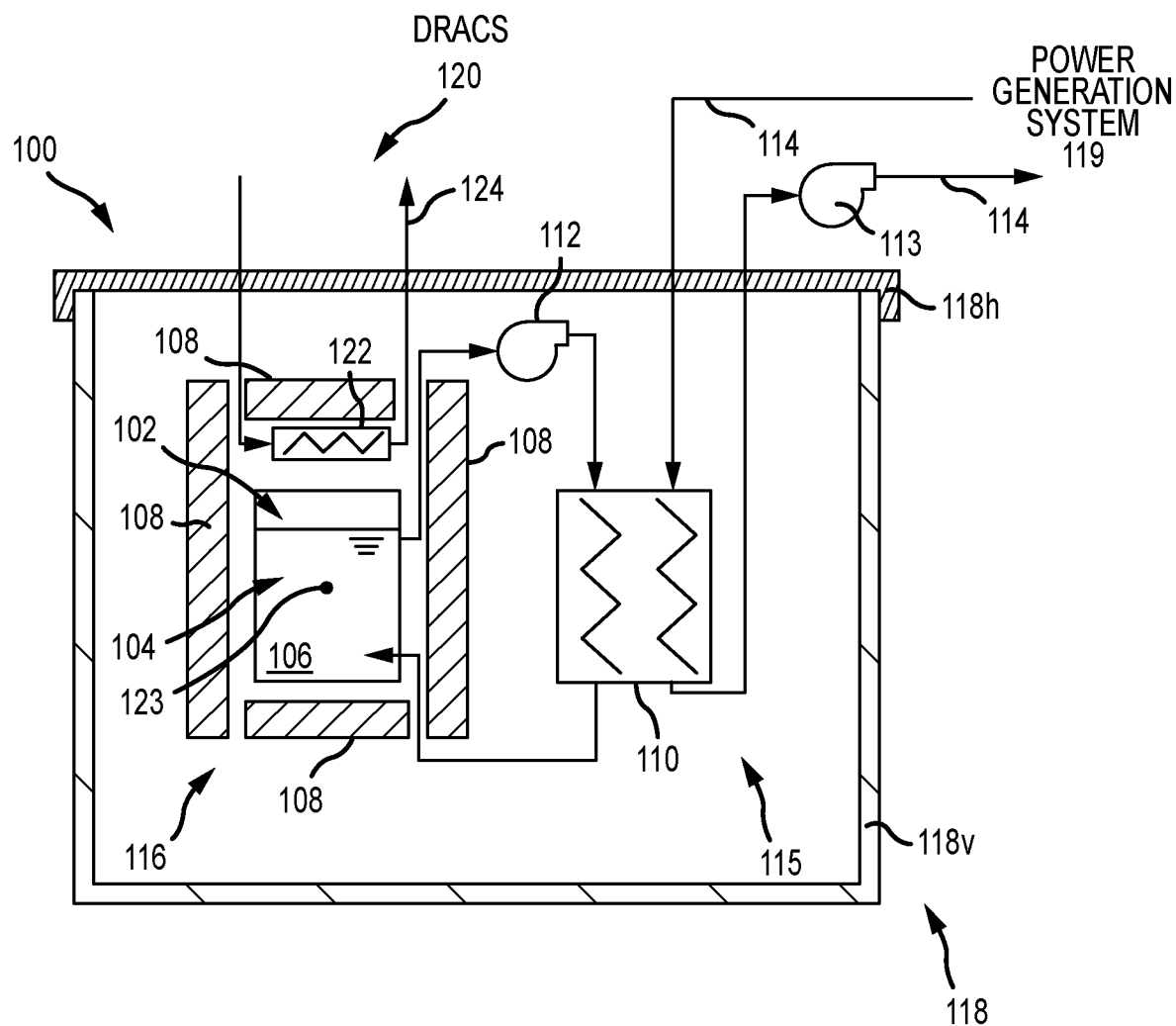
FIG. 1 illustrates, in a block diagram form, some of the basic components of a molten fuel reactor.

FIG. 1 illustrates, in a block diagram form, some of the basic components of a molten fuel reactor. In general, a molten fuel reactor 100 includes a reactor core 104 containing a fissionable fuel salt 106 that is liquid at the operating temperature range. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The fuel salt 106 may or may not completely fill the core 104, and the embodiment shown is illustrated with an optional headspace 102 above the level of the fuel salt 106 in the core 104. The size of the reactor core 104 may be selected based on the characteristics and type of the particular fuel salt 106 being used in order to achieve and maintain the fuel in an ongoing state of criticality, during which the heat generated by the ongoing production of neutrons in the fuel causes the temperature of the molten fuel to rise when it is in the reactor core 104. The performance of the reactor 100 is improved by providing one or more reflectors 108 around the core 104 to reflect neutrons back into the core. The molten fuel salt 106 is circulated between the reactor core 104 and one or more primary heat exchangers 110 located outside of the core 104. The circulation may be performed using one or more pumps 112. In other examples, the circulation may be induced by the natural circulation of the fuel salt 106 during normal operation as described further below.

The primary heat exchangers 110 transfer heat from the molten fuel salt 106 to a primary coolant 114 that is circulated through a primary coolant loop 115. In an embodiment the primary coolant may be another salt, such as $NaCl$—$MgCl_2$, or lead. Other coolants are also possible including Na, NaK, supercritical $CO_2$ and lead bismuth eutectic. In an embodiment, a reflector 108 is between each primary heat exchanger 110 and the reactor core 104 as shown in FIG. 1. For example, in an embodiment a cylindrical reactor core 104, having a diameter of 2 meters (m) and a height of 3 m, is oriented vertically so that the flat ends of the cylinder are on the top and bottom respectively. The entire reactor core 104 is surrounded by reflectors 108 between which are provided channels for the flow of fuel salt 106 into and out of the reactor core 104. Eight primary heat exchangers 110 are distributed azimuthally around the circumference of the reactor core 104 and reflector assembly 108, each provided with pumps to drive circulation of the fuel salt. In alternative embodiments, a different number of primary heat exchangers 110 may be used. For example, embodiments having 2, 3, 4, 5, 6, 8, 12, and 16 primary heat exchangers are contemplated.

In the embodiment shown in FIG. 1, in normal (power generating) operation the fuel salt is pumped from the reactor core 104, through the primary heat exchanger 110 and cooled fuel salt is returned back to reactor core 104. Heated primary coolant 114 from the primary heat exchangers 110 is passed to a power generation system 119 for the generation of some form of power, e.g., thermal, electrical or mechanical. The reactor core 104, primary heat exchangers 110, pumps 112, molten fuel circulation piping (including other ancillary components that are not shown such as check valves, shutoff valves, flanges, drain tanks, etc.) and any other components through which the molten fuel circulates or contacts during operation can be referred to as the fuel circuit 116. Likewise, the primary coolant loop 115 includes those components through which primary coolant circulates, including the primary heat exchangers 110, primary coolant circulation piping (including other ancillary components that are not shown such as coolant pumps 113, check valves, shutoff valves, isolation valves, flanges, drain tanks, etc.).

Salt-facing elements of the heat exchanger 110 and the primary coolant loop 115 may be clad to protect against corrosion. Other protection options include protective coatings, loose fitting liners or press-fit liners. In an embodiment, cladding on the internal surface of the tubes is molybdenum that is co-extruded with the base heat exchanger tube material. For other fuel salt contacting surfaces (exterior surfaces of the tube sheets and exterior surface of the shell), the cladding material is molybdenum alloy. Nickel and nickel alloys are other possible cladding materials. Niobium, niobium alloys, and molybdenum-rhenium alloys may be used where welding is required. Components in contact with primary cooling salt may be clad with Alloy 200 or any other compatible metals, such as materials meeting the American Society of Mechanical Engineers' pressure vessel code. The tube primary material may be 316 stainless steel or any other compatible metals. For example, in an embodiment, alloy 617 is the shell and tube sheet material.

The molten fuel reactor 100 further includes at least one containment vessel 118 that contains the fuel circuit 116 to prevent a release of molten fuel salt 106. The containment vessel 118 is often made of two components: a lower, vessel portion 118v that takes the form of a unitary, open-topped vessel with no penetrations of any kind; and an upper, cap portion 118h referred to as the vessel head that covers the top of the vessel portion 118v. All points of access to the reactor 100 are from the top through the vessel head 118h.

One possible situation faced by the reactor 100 is a loss of forced flow event in which, possibly due to a power failure or some other cause, the salt pumps 112 cease to function. In such an event, the reactor 100 must still be cooled to prevent an unacceptable temperature increase even after the protection system shuts down the fission chain reaction because fission products in the fuel salt 106 will continue to produce decay heat. As such, reactors 100 are often provided with a direct reactor auxiliary cooling system (DRACS) 120 specifically to limit this temperature increase before there is damage to any of the components. A DRACS 120 is an auxiliary cooling system, which may or may not be completely independent of the primary coolant loop 115, which is designed to provide auxiliary cooling in certain circumstances, such as to remove decay heat from the fuel salt 106 during a loss of forced flow event or other events. The DRACS 120 may be a single loop system with a heat exchanger 122 disposed within the reactor 100. In some examples, multiple independent DRACS 120 loops may be used in the reactor 100, each corresponding to different parallel fuel salt flow paths. Additionally or alternatively, the DRACS 120 may have any number of multiple loops connected through additional external heat exchangers (not shown) to remove the heat from the reactor 100.

In some cases, a DRACS 120 relies on the natural circulation of the fuel salt through the fuel circuit 116, because higher temperature molten salt is less dense than lower temperature salt. For example, in one fuel salt (71 mol % $UCl_4$-17 mol % $UCl_3$-12 mol % NaCl) for a 300° C. temperature rise (e.g., 627° C. to 927° C.), the fuel salt density was calculated to fall by about 18%, from 3680 to 3010 kg/m$^3$. The density differential created by the temperature difference between the higher temperature salt in the core and the lower temperature salt elsewhere in the fuel circuit 116 creates a circulation cell in the fuel circuit. This circulation is referred to as natural circulation and occurs without the use of pumps 112. In other examples, the circulation may be an active flow driven by the pumps 112.

FIG. 1 illustrates schematically a DRACS heat exchanger 122 dedicated to the removal of decay heat during a reactor shutdown event. A reactor shutdown event may be a planned reactor shutdown, an unplanned loss of forced flow in the fuel salt circuit, or some other event that requires the uses of the DRACS 120 to remove heat from within the containment vessel 118. The decay heat that is generated in a reactor shutdown event is general a lower amount of heat than the heat generated during normal reactor operation. As such, the DRACS heat exchangers 122 are referred to as Decay Heat Heat Exchangers (DHHXs) to differentiate them from the primary heat exchangers (PHXs) 110. In the embodiment shown, the DHHXs 122 and PHXs 110 are shell and tube exchangers in which multiple tubes (referred to as the tubeset or tube bundle) pass through a shell that are configured to allow passage of molten fuel salt 106. Fuel salt flows through the tubeset and is cooled by the coolant. In other examples, the fuel salt flow may flow through the shell side and the coolant is channeled through the tubeset.

Figure 2:
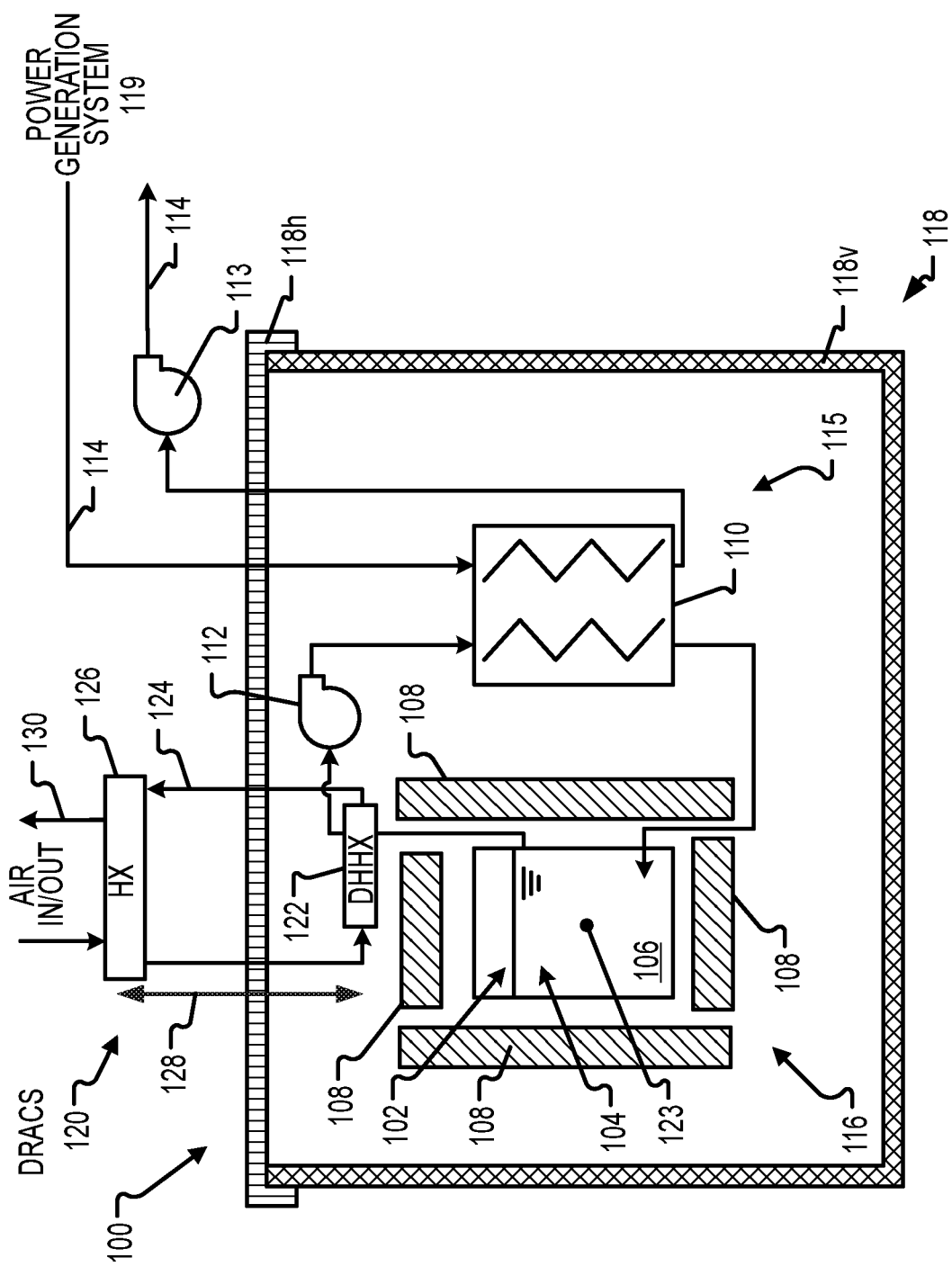
FIG. 2 illustrates, in block diagram form, another configuration of the basic components of a molten fuel reactor.

In various embodiments depicted herein, one or more DHHXs 122 may be disposed in the containment vessel 118, in various locations as required or desired for a particular application. In FIG. 1, the DHHX 122 is depicted schematically above the core 104 for explanatory purposes. For example, the DHHX 122 is positioned above a geometric center 123 of the core 104. The geometric center 123 is approximately the thermal center of the core, where the most heat is generated during a reactor shutdown event, such that the less dense, higher temperature molten salt is circulated through the DHHX 122 during natural circulation of the fuel salt as described above. It should be appreciated that the thermal center of the natural circulation of the fuel salt is based on a number of flow properties and is time dependent, and as such, may be above or below the geometric center depending on the fuel salt conditions. In FIG. 2, described further below, the DHHX 122 may be disposed outside of the reflectors 108, but still above the geometric center 123, so that radiation absorption is decreased. Other locations are described herein and in U.S. patent application Ser. No. 15/813,901, filed Nov. 15, 2017, entitled "Thermal Management of Molten Fuel Reactors," the disclosure of which is hereby incorporated by reference herein in its entirety.

In the embodiment shown in FIG. 1, a DRACS coolant loop 124 and the PHX coolant loop 115 are provided by independent coolant circuits, but other configurations are contemplated and described herein. The DHHXs 122 and PHXs 110 in each cooling circuit may be different types of heat exchangers or may be similar types of heat exchangers. For example, in addition to shell and tube heat exchangers, plate (sometimes also called plate-and-frame), plate and shell, printed circuit (also known as diffusion bonded compact heat exchangers), plate fin heat exchangers, concentric tube (or pipe) heat exchangers (sometimes also called jacketed pipe or double pipe heat exchangers), and bayonet tube heat exchangers may be suitable as required or desired. Alternatively or additionally, the relative locations of the DHHXs 122 and PHXs 110 to each other may be varied, as described herein. For example, a DHHX 122 may be located next to its associated PHX 110. In yet another embodiment, not all of the salt passing through the PHX 110 may also pass through its associated DHHX 122.

The primary coolant and the DRACS coolant may be the same composition or may be different. In an embodiment the primary and/or DRACS coolant may be another salt, such as NaCl—$MgCl_2$, or lead. Other coolants are also possible including Na, NaK, supercritical $CO_2$, lead bismuth eutectic, Galinstan (e.g., eutectic alloy of gallium, indium, and tin), as well as liquid metals, air, etc. During normal, power-generating operation, the DRACS 120 may or may not be cooling the fuel salt 106. In one embodiment, for example, the DHHXs 122 do not provide any significant cooling during normal operation so that vast majority of the heat removed from the fuel salt is removed by the PHXs 110. In this embodiment, DRACS coolant in the DHHX 122 is allowed to heat up to the operating temperature. The heated DRACS coolant may be periodically or continuously circulated, such as through the DHHX 122 or the DRACS coolant loop 124, to prevent fouling. In an alternative embodiment, the DRACS 120 is continuously operated and the heat removed by the DRACS coolant loop 124 may or may not be recovered for power generation or general heating.

FIG. 2 illustrates, in block diagram form, another configuration of some of the basic components of a molten fuel reactor. Certain components are depicted above with regard to FIG. 1 and, as such, are not described further. In this example, the molten fuel reactor 100 includes the DHHX 122 that is depicted schematically above the top reflector 108 and above the geometric center 123. The DHHX 122 may be disposed outside of the reflectors 108 so that radiation absorption is decreased. Additionally, a multiple loop DRACS 120 is depicted. In this example, the DRACS coolant loop 124 includes a second heat exchanger 126 disposed at a higher elevation 128 than the DHHX 122. In one example, the elevation difference 128 between the heat exchangers may be approximately 20 meters.

In operation, the fuel salt exits the reactor core 104 and may enter the DHHX 122 that, for example, is contained within an upper flow channel. In an aspect, the DHHX 122 may be a single path cross-flow shell and tube heat exchanger, and as such, the fuel salt is channeled through the tube-side of the DHHX 122 and heat is removed on the shell-side of the DHHX 122 via a coolant fluid channeled through the DRACS coolant loop 124. Examples of the DRACS coolant includes, but is not limited to, molten salts, liquid metals (e.g., Galinstan), air, etc. The DRACS coolant loop 124 may be a forced active flow (e.g., pumped) or driven via natural circulation of the coolant through the DHHX 122 (e.g., devoid of any primary circulating pumps). When the loop 124 is driven by natural circulation, the loop 124 may include a pump for startup, shakedown, or testing as required or desired. The DRACS 120 may further include any number of additional coolant loops connected through additional heat exchangers (e.g., the heat exchanger 126) to remove heat through the DHHX 122 from the core 104. In the example depicted in FIG. 2, the DRACS 120 is a passive system and the DRACS coolant loop 124 may remove heat from the DHHX 122 driven by natural circulation of the coolant fluid. This coolant circulating through the DRACS coolant loop 124 may remove heat to another second coolant loop 130 through the second heat exchanger 126 that is positioned at a higher elevation 128 than the DHHX 122. In the example, the second heat exchanger 126 enables heat from the coolant loop 124 to be removed through a natural circulation of air. In other examples, any other coolant fluid may be used as required or desired. Additionally, in some examples, a damper (not shown) may be used to control the air flow during normal reactor 100 operation, so as to reduce undesirable heat loss through the DRACS 120 during normal operation. This damper may be configured to passively fail open during a loss of onsite power or similar transient, where decay heat would need to be passively removed through the DRACS 120 and as described herein.

Broadly speaking, this disclosure describes multiple alterations and component configurations that improve the performance of the reactor 100 described with reference to FIGS. 1 and 2.

FIGS. 3-16 depict a number of configurations of a molten fuel reactor utilizing a DRACS. In general, the location of the DHHX in each configuration may be described based on a number of characteristics, features, and performance criteria. For example, the location of the DHHX may be described as serial or parallel to the PHX. A serially-located DHHX sees generally the same volume of molten fuel salt passing therethrough as does the PHX. In a parallel-located DHHX, the location of the DHHX relative to the PHX essentially splits a flow of molten salt between those two heat exchangers. Molten fuel salt flow through the DHHX may be described as indirect and passive flow (e.g., receiving a flow of fuel salt due to the natural circulation flow of the fuel salt), or direct and active flow (e.g., receiving a flow of fuel salt directly due to the pump inducing the flow of the fuel salt). In an indirect and passive configuration, the DHHX may be positioned parallel to a pump such that fuel salt flow through the DHHX is due to natural circulation of the fuel salt which is indirect from the pump operations. While in the direct and active configuration, the DHHX may be positioned with respect to the pump such that fuel salt flow is channeled directly through the DHHX via the pump operations. A hybrid configuration is also contemplated, where the DHHX is only partially within a direct path of a flow of fuel salt from the pump operations (e.g., where a certain volume of fuel salt bypasses the DHHX). Certain positions of the DHHX may make desirable a flow conditioner or other feature or structure that conditions flow so as to not adversely affect pump or PHX performance. Additionally, the DHHX may have a dedicated coolant circuit, e.g., separate from the primary coolant loop, or may share the coolant circuit with the PHX. With these general descriptions in mind, a number of configurations are depicted in further detail below.

Example Molten Fuel Reactor Configurations

Figure 3:
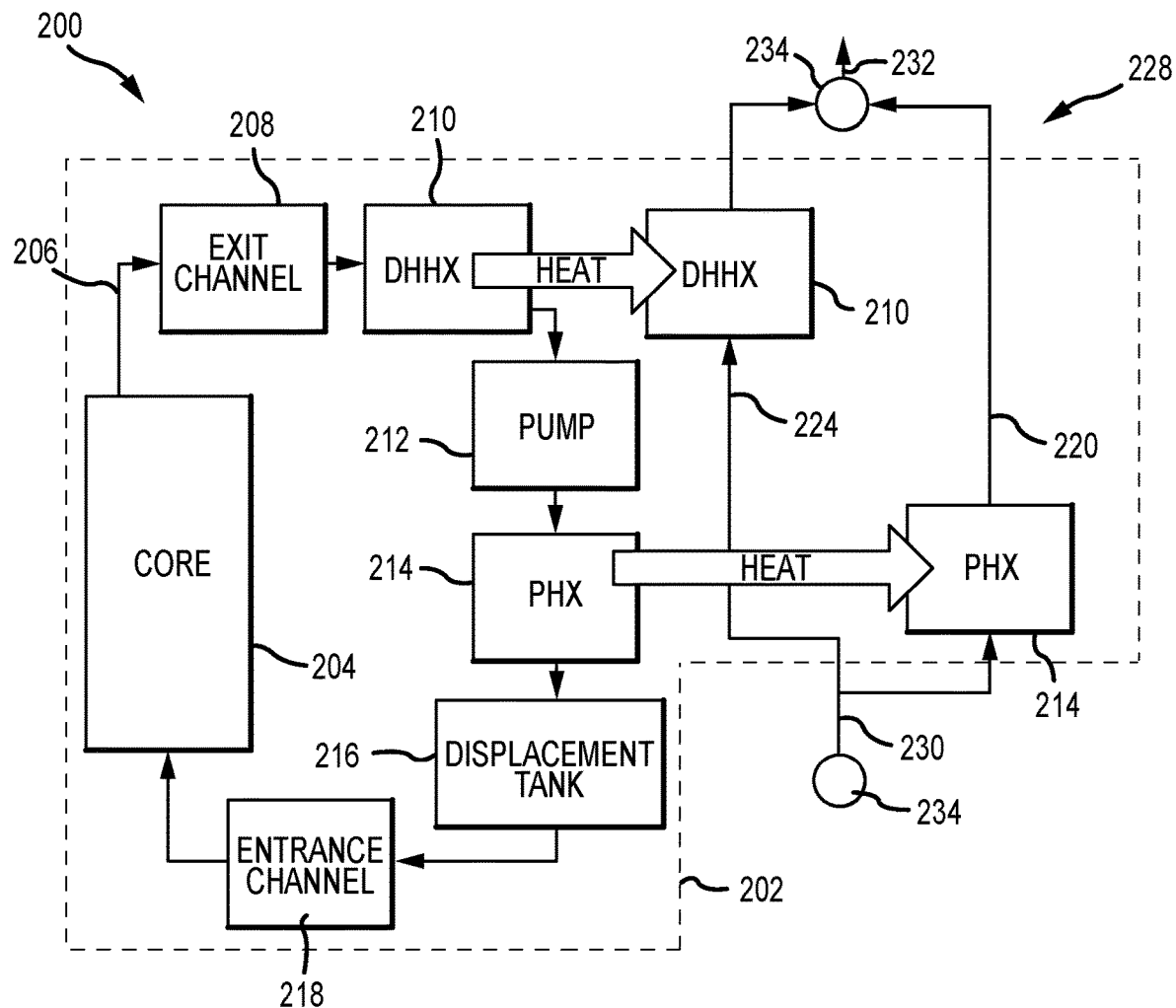
FIG. 3 depicts, schematically, an exemplary configuration of a Decay Heat Heat Exchanger (DHHX) in a molten fuel reactor.

FIG. 3 depicts, schematically, an exemplary configuration of a DHHX in a molten fuel reactor 200. A number of components and systems are depicted as either external or internal to a vessel 202. Reactions take place in central core 204 of the reactor 200. The primary molten fuel flow path 206 and direction is depicted by the single line arrows in FIG. 3. Upon exiting the core 204 as hot molten fuel salt, the fuel salt is drawn into an exit or outlet flow channel 208 in communication with the core 204. Fuel salt flow 206 continues to the DHHX 210 that, in this configuration, is disposed within the exit channel 208, such that the fuel salt flows completely therethrough. As such, this DHHX may be referred to as serial (as relates to the PHX and pump) and active flow (as relates to molten salt fuel flow directly induced by the pump). The fuel salt flow 206 is next drawn into a pump 212 that circulates molten fuel salt through the reactor 200. The pump 212 is, in this case, downstream of the DHHX 210 and upstream of a PHX 214. The pump 212 discharges downstream to the PHX 214, where heat is extracted from the hot molten fuel salt, such that it exits the PHX 214 as cold molten fuel salt.

Fuel salt flow 206 may continue to an optional displacement volume 216 so that the amount of fuel salt through the flow path can be reduced and/or increased as required or desired. In other examples, the displacement volume 216 may be in fluid communication with a separate displacement tank (not shown) that is configured to store at least a portion of the fuel salt. Additionally or alternatively, a displacement volume 217 (shown in FIG. 4) may be located above the heat exchangers and proximate the exit channels 208. The cold molten fuel salt is then delivered to the core 204, via an entrance or inlet channel 218, where it is reheated and the recirculation process continues. In the example, the PHX 214 is separated from the central core 204 by one or more reflectors (not shown) and between the exit channel 208 and the inlet channel 218. Additionally, the direction of fuel salt flow 206 is substantially different between the DHHX 210 and the pump 212, with the flow through the DHHX 210 being substantially horizontal within the vessel 202 and the flow through the pump 212 being substantially vertical within the vessel 202 as described further below in reference to FIGS. 4 and 5.

With regard to cooling flow circuits (that is, flow circuits that are partially within and partially outside of the vessel 202), two interconnected circuits are depicted. A primary coolant loop 220 is connected to the PHX 214 and transfers heat to a primary coolant that is channeled through the PHX 214. Similarly, a DRACS coolant loop 224 transfers decay heat to a DRACS coolant that is channeled through the DHHX 210. In the depicted configuration, both the primary coolant loop 220 and the DRACS coolant loop 224 are served by a single coolant loop 228, where heat is withdrawn for energy production, as described elsewhere herein. In the single coolant loop 228 depicted, coolant 230 (e.g., cold molten salt) is delivered, via one or more pumps 234, in parallel to the inlet of both the PHX 214 and DHHX 210, with heated coolant 232 (e.g., hot molten salt) exhausted from those components. The coolant loop 228 may be a single coolant loop (e.g., only include the DHHX 210 and PHX 214 within the vessel 202) or have multiple coolant loops and include one or more external heat exchangers (not shown) disposed outside of the vessel 202. In other examples, the coolant loop 228 may include other coolant fluids, such as, but not limited to, liquid metals (e.g., Galinstan), air, etc. as required or desired. By using the coolant loop 228, the number of redundant systems and components decreases, thereby lowering costs of the coolant loop.

Figure 4:
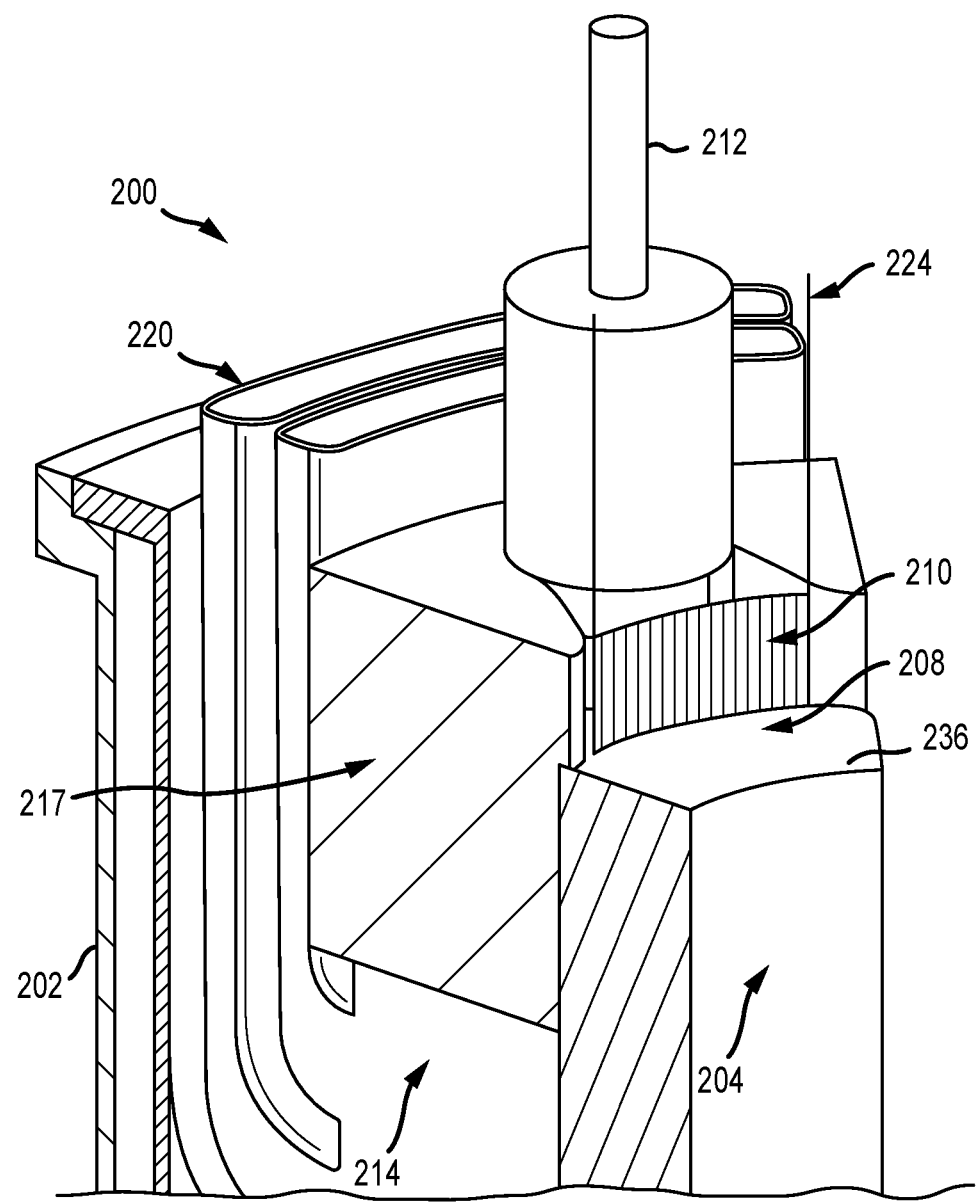
FIG. 4 is a sectional perspective view of the DHHX configuration shown in FIG. 3.

FIG. 4 is a sectional perspective view of the DHHX configuration shown in FIG. 3. Certain components are depicted above with regard to FIG. 3 and, as such, are not described further, additionally, components disposed outside the vessel 202 are not depicted, but the various coolant circuits may be any of those depicted in the above figures, or those depicted and described in the figures below, or any others as required or desired. In this example, the DHHX 210 is disposed within the exit channel 208 and within the direct molten fuel flow path 206 between the core 204 and the pump 212. The exit channel 208 is between the vessel head (not shown) and the top of a reflector 236 which at least partially forms the core 204. As such, fuel salt flow through the exit channel 208 is substantially horizontal with the vessel 202 and the flow through the pump 212 and the PHX 214 is substantially vertical within the vessel 202. In the embodiment, the DHHX 210 cross flows the DRACS coolant perpendicularly to the direction of the fuel salt flow in the exit channel 208. The DHHX 210 extends across the entire exit channel 208 and is at least partially curved to correspond to the cylindrical core 204.

Figure 5:
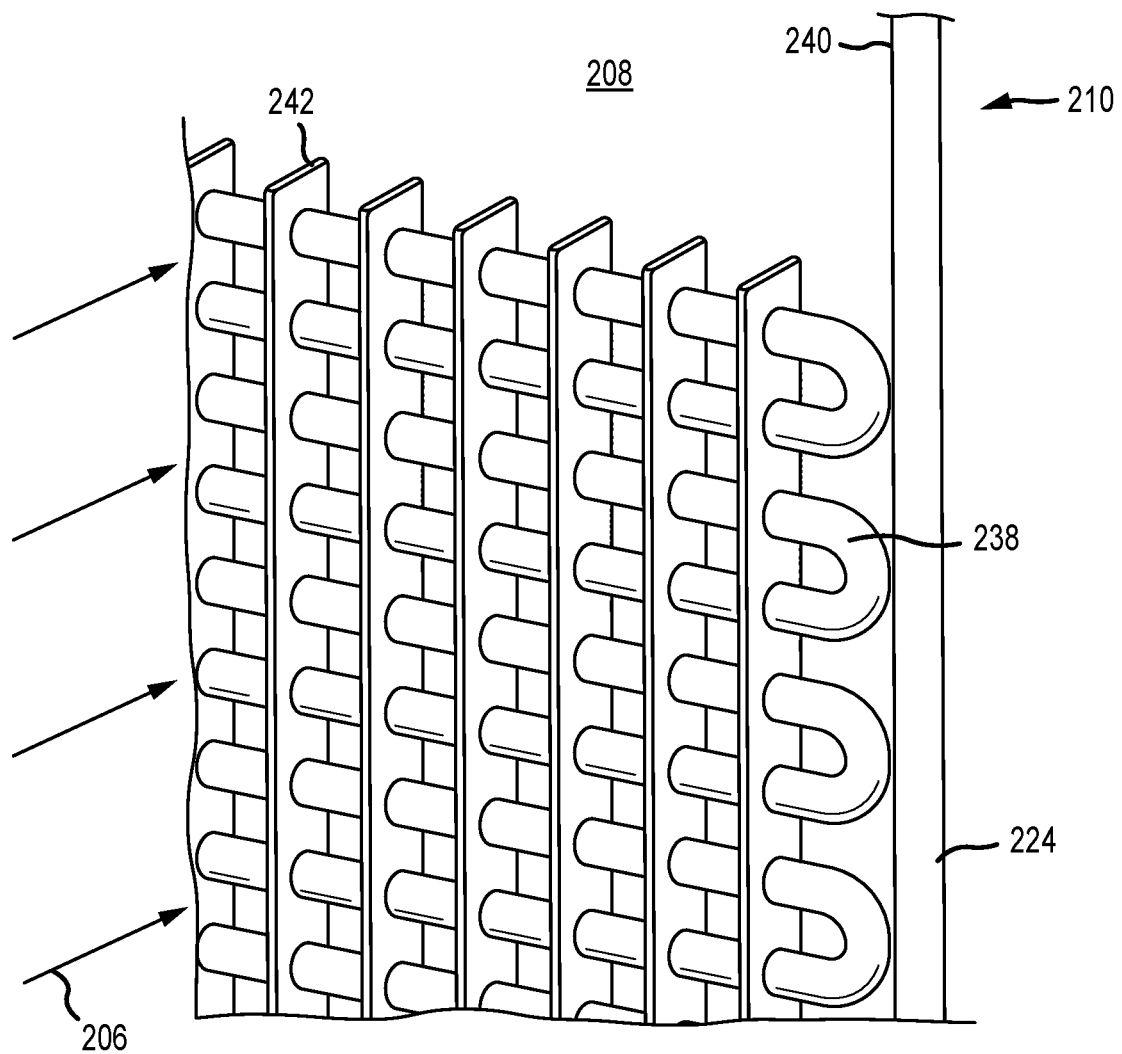
FIG. 5 is an enlarged perspective view of the DHHX configuration shown in FIG. 4.

FIG. 5 is an enlarged perspective view of the DHHX configuration shown in FIG. 4. With continued reference to FIG. 4, in the example, the DHHX 210 is a shell and tube heat exchanger in which a continuous set of horizontal tubes 238 (referred to as the tubeset or tube bundles) channeling a coolant flow therethrough are disposed within a shell channeling the molten fuel salt flow 206 therethrough. The shell in this example is formed by the exit channel 208. This configuration is sometimes referred to as a shell-side fuel/tube-side coolant configuration in that the fuel salt flow 206 flows through the shell and is cooled by the coolant within the tubeset 238. The coolant of the DHHX 210 is circulated by the DRACS coolant loop 224 and includes an inlet 240 and an outlet (not shown and opposite the inlet).

Alternative embodiments are also possible. For example, the DHHXs 210 in a heat exchanger circuit may be different types of heat exchanges. In addition to shell and tube heat exchangers, plate (sometimes also called plate-and-frame), plate and shell, printed circuit (also known as diffusion bonded compact heat exchangers), plate fin heat exchangers, concentric tube (or pipe) heat exchangers (sometimes also called jacketed pipe or double pipe heat exchangers), and bayonet tube heat exchangers may be suitable. Likewise, the location of the coolant inlet 240 and return ducts may be varied.

In the example, the tubeset 238 is supported by one or more plates 242. In addition to enabling support of the tubeset 238, the plates 242 also perform as an integrated flow straightening device so as to straighten the flow of the molten fuel salt 206 as it is channeled through the tubeset 238. By placing the DHHX 210 within the exit channel 208, undesirable flow conditions such as turbulence, eddies, swirl flows, non-uniform velocity profiles, and the like may be reduced or eliminated in the fuel salt flow 206. To reduce pump cavitation induced by these undesirable flow conditions and to increase pump efficiencies, the plates 242 are configured to reduce the swirl components in the fluid flow when channeled through the DHHX 210. Flow straightening may be done using any other kind of baffles, contours, vanes, flow conditioners, and/or other equipment as required or desired. For example, the plates 242 may act in concert with the exit channel 208 (formed by one or more reflectors) to define the flow conditioner that straightens the fuel salt flow 206.

Alternative embodiments are also possible. For example, the flow straightening device may be a separate flow conditioner component from the DHHX 210 and positioned downstream from the DHHX 210 and upstream of the pump 212. In other examples, the flow straightening device may be upstream of the DHHX 210. In another example, the flow straightening device may be positioned proximate the end of the exit channel 208 where the fuel salt flow 206 turns a corner and as such may be shaped, angled, or otherwise aligned to direct the flow around the corner in order to enhance the efficiencies of the pump 212 even more.

Figure 6:
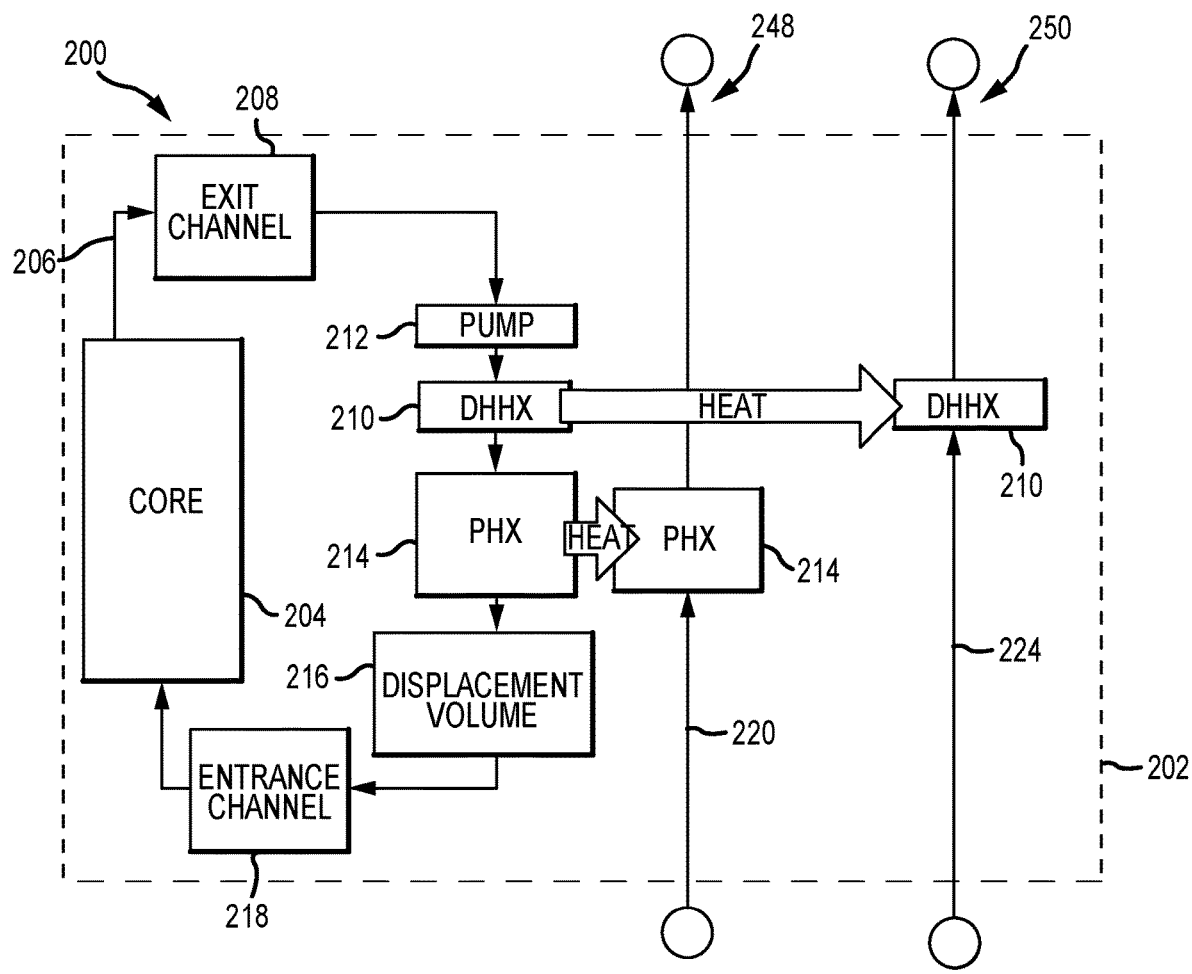
FIG. 6 depicts, schematically, another configuration of a DHHX in a molten fuel reactor.
Figure 7:
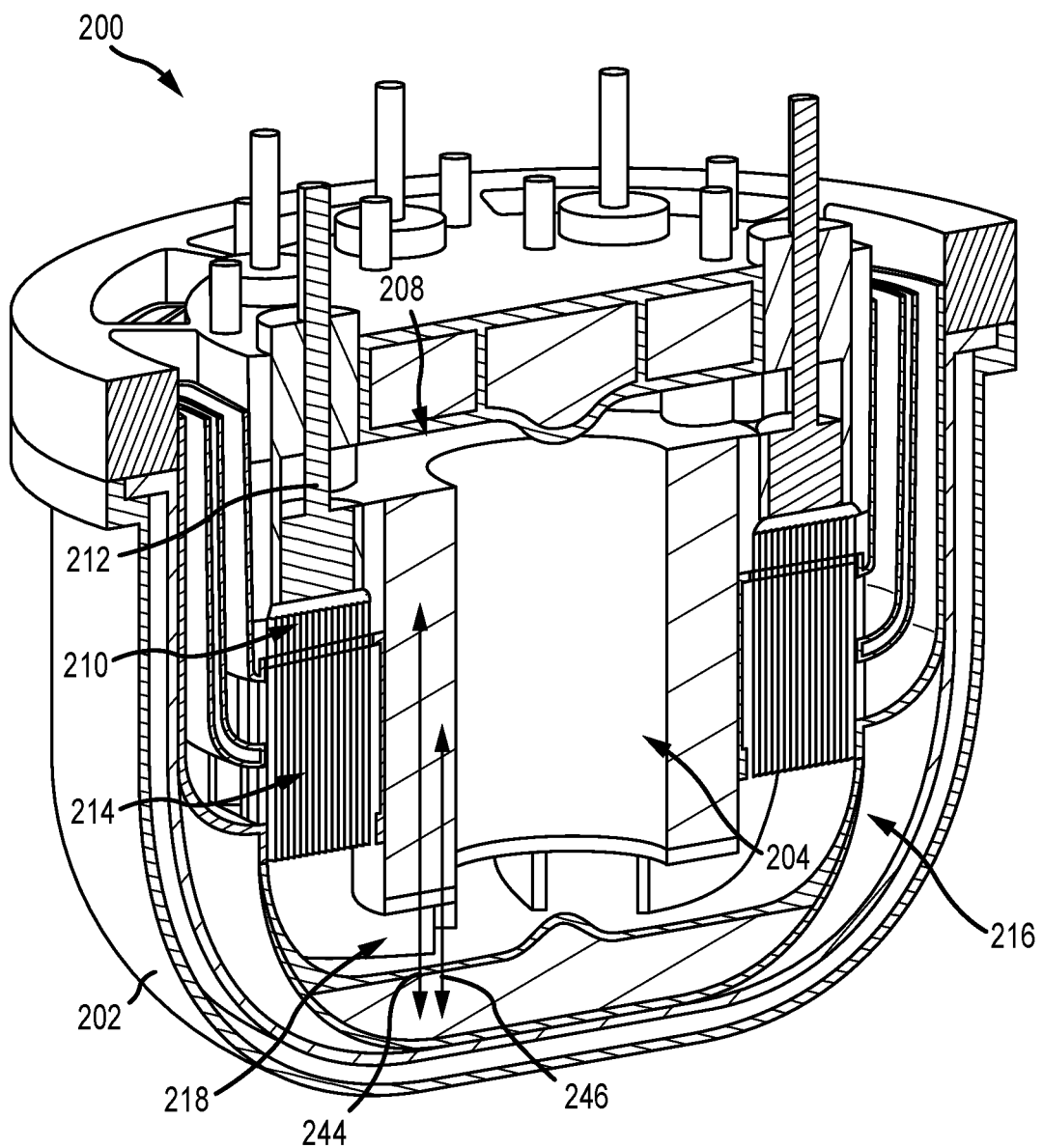
FIG. 7 is a sectional perspective view of the DHHX configuration shown in FIG. 6.

FIG. 6 depicts, schematically, another configuration of a DHHX in a molten fuel reactor 200. FIG. 7 is a sectional perspective view of the DHHX configuration shown in FIG. 6. Certain components are depicted above with regard to FIGS. 3-5 and, as such, are not described further. Referring concurrently to FIGS. 6 and 7, the pump 212 is upstream of both the DHHX 210 and the PHX 214, while the DHHX 210 is upstream to only the PHX 214. In this configuration, the DHHX 210 is serially located relative to the PHX 214. That is, the DHHX 210 is disposed a DHHX distance 244 above a bottom portion of the vessel 202 and the DHHX distance 244 is greater than and in line with a PHX distance 246 of the PHX 214 positioned above the bottom portion. Additionally, molten fuel salt flow 206 through the DHHX 210 is an active flow, in that the discharge from the pump 212 directs the flow through the DHHX 210. In this example, the direction of fuel salt flow 206 is direct and substantially similar between the DHHX 210 and the pump 212, with both being substantially vertical within the vessel 202.

In the configuration of FIG. 6, the primary coolant loop 220 and the DRACS coolant loop 224 differ from those previously depicted, in that each of the PHX 214 and DHHX 210 are each connected to dedicated and independent flow circuits 248, 250, respectively and each circuit has separate coolant loops with pumps and/or external heat exchangers. The flow circuits 248, 250 are not illustrated in FIG. 7 for clarity. In other examples, the DRACS circuit 250 may not include pumps and is configured to naturally circulate. By using discrete circuits, different coolant fluid with different thermal-fluid properties may be used in each circuit so as to increase heat removal performance and efficiencies. For example, a molten salt with a lower melting temperature may be beneficial for use in the DRACS circuit 250. In other examples, the DRACS circuit 250 may include other coolant fluids, such as, but not limited to, liquid metals (e.g., Galinstan), air, etc. as required or desired. Also, the piping of the discrete circuits 248, 250 may be sized for a single function (e.g., decay heat removal). Additionally, by using discrete circuits, the thermal mass of the DRACS circuit 250 may be reduced so as to facilitate a faster cooling response.

Figure 8:
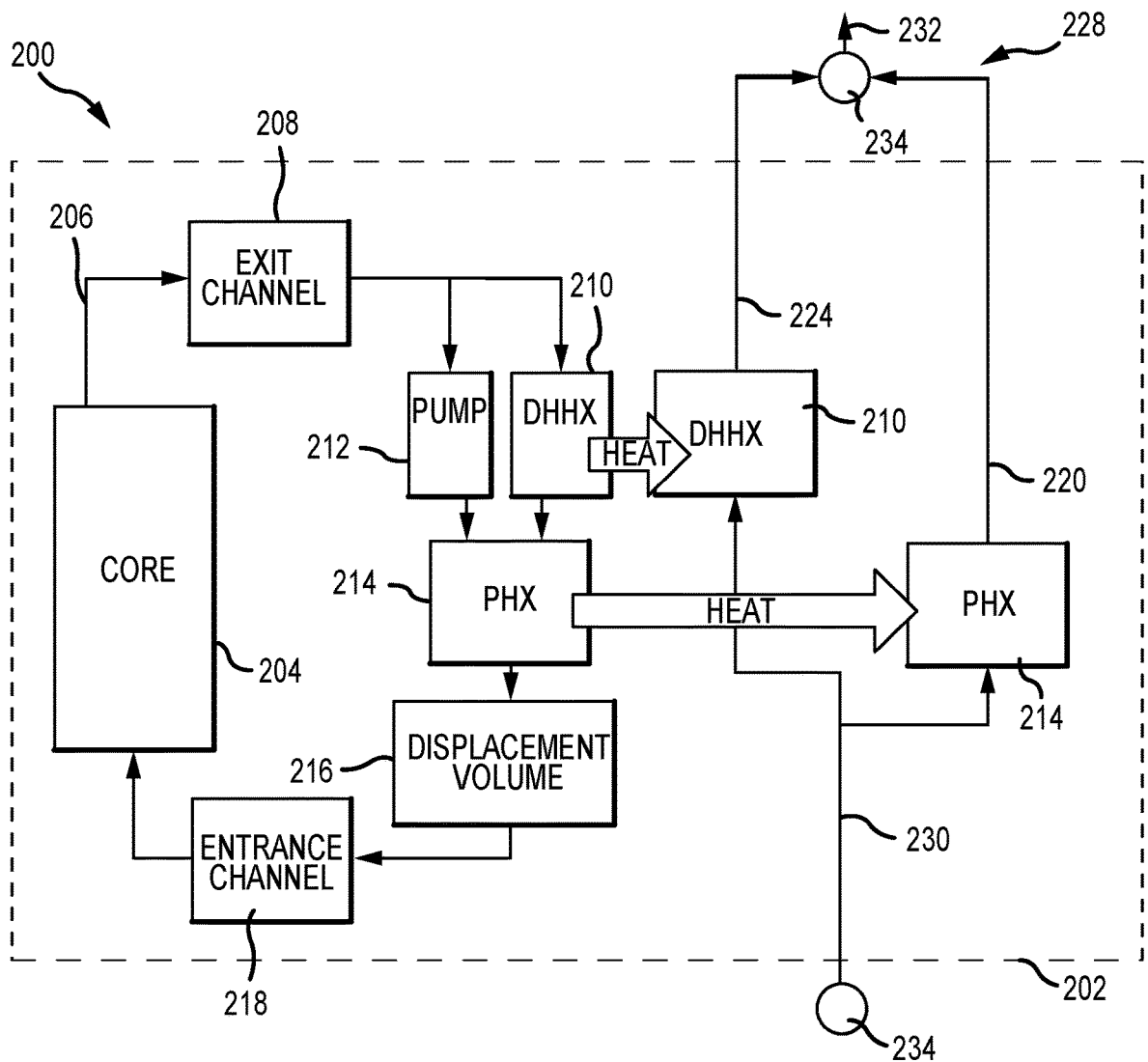
FIG. 8 depicts, schematically, another configuration of a DHHX in a molten fuel reactor.

FIG. 8 depicts, schematically, another configuration of a DHHX in a molten fuel reactor 200. Certain components are depicted above with regard to FIGS. 3-7 and, as such are not described further. One difference between the molten salt reactors of FIGS. 3-7 and FIG. 8 is the location of the DHHX 210. In this example, the molten fuel flow path 206 splits after passing through the exit channel 208. A portion of the flow 206 is drawn through the circulating pump 212 and delivered to the PHX 214. The DHHX 210 is disposed adjacent the pump 212 and, while molten fuel salt is not circulated directly therethrough, fuel salt flow 206 may be induced through the DHHX 210 through natural circulation of the fuel salt if the pump 212, DHHX 210, and inlets thereto and outlets therefrom are appropriately sized and configured. As such, this DHHX may be referred to as parallel (as relates to the pump) and passive flow (as relates to natural circulation of the molten salt fuel flow). The single coolant loop 228 shares the same configuration with that of FIG. 3.

Figure 9:
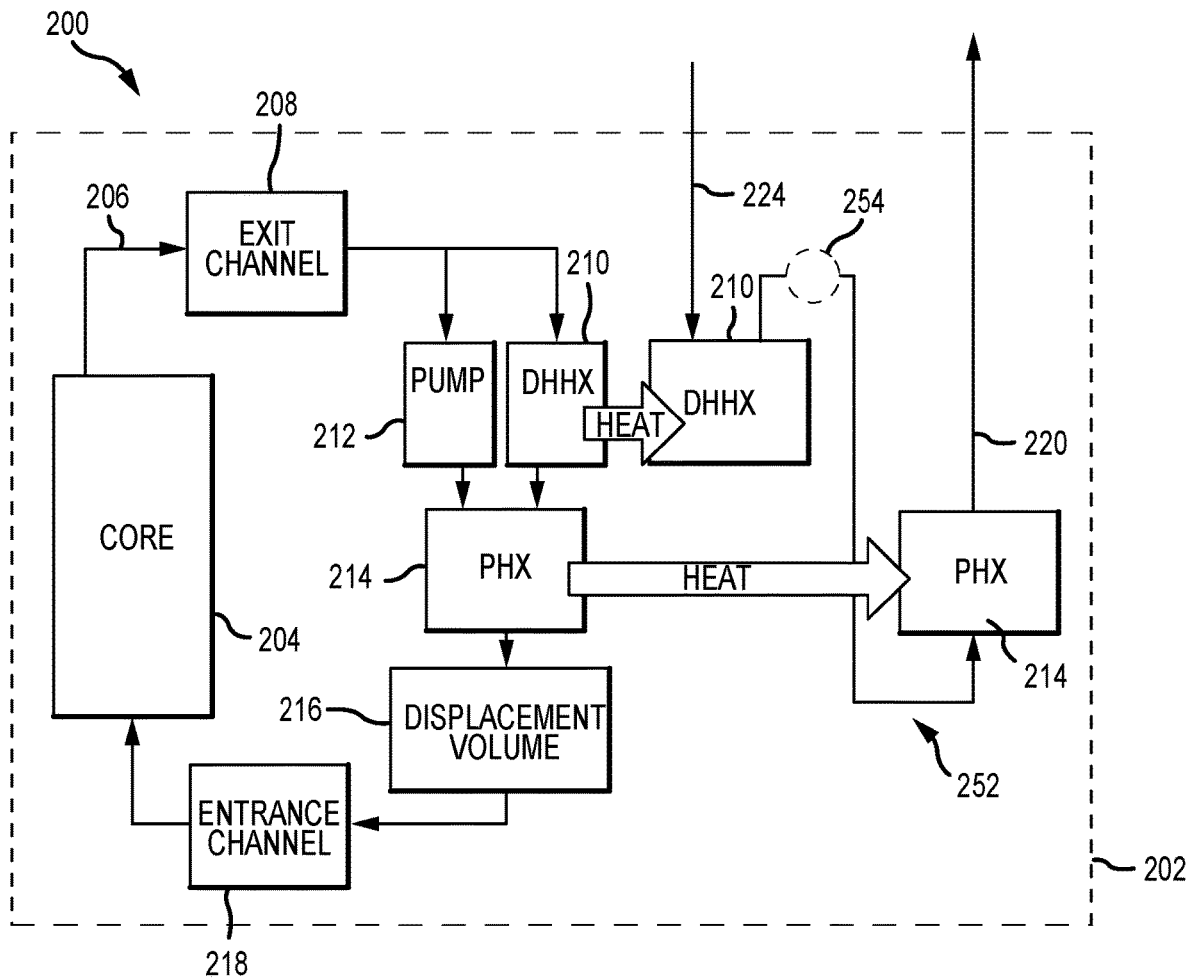
FIG. 9 depicts, schematically, another configuration of a DHHX in a molten fuel reactor.

FIG. 9 depicts, schematically, another configuration of a DHHX in a molten fuel reactor 200. Certain components are depicted above and, as such, are not necessarily described further. In this example, the configuration of the DHHX 210 is similar to that depicted in FIG. 8 and the molten fuel flow path 206 splits after passing through the exit channel 208 with a portion of the flow 206 drawn through the circulating pump 212 and a portion of the flow 206 which may be induced through the DHHX 210. Additionally, in the configuration of FIG. 9, the primary coolant loop 220 and the DRACS coolant loop 224 differ from those previously depicted. The primary coolant loop 220 and the DRACS coolant loop 224 are serially combined into a single coolant loop 252 that flows first through the DHHX 210, then through the PHX 214. In this example, the heat extracted by the DRACS coolant loop 224 is recoverable and may be utilized to contribute to the power conversion cycle of the rector during operation. In an alternative embodiment, flow through the single exterior coolant loop 252 may be reversed. In some examples, one or more pumps 254 may be located between the DHHX 210 and the PHX 214 to facilitate coolant flow through the coolant loop 252. The pumps 254 may be positioned within the vessel 202 as illustrated, or positioned outside the vessel 202 as required or desired.

Figure 10:
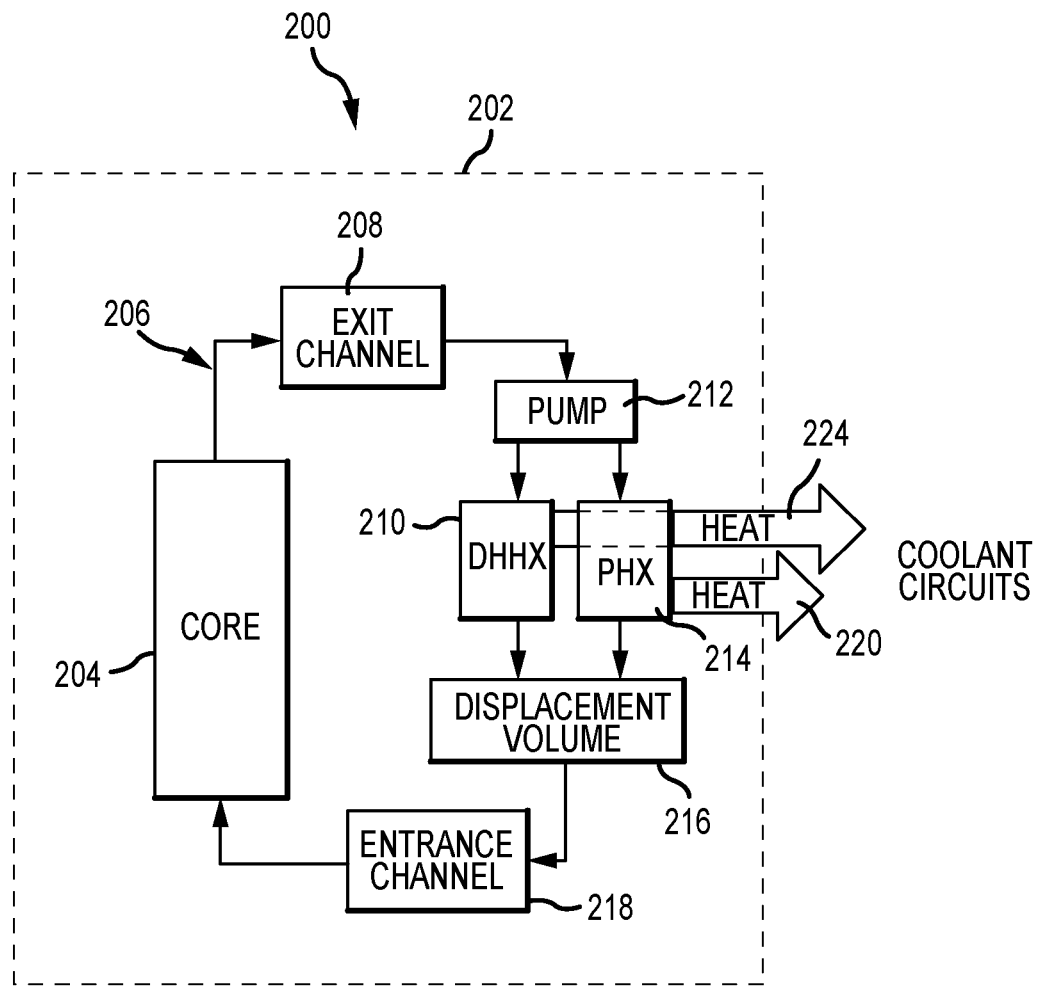
FIG. 10 depicts, schematically, another configuration of a DHHX in a molten fuel reactor.
Figure 11:
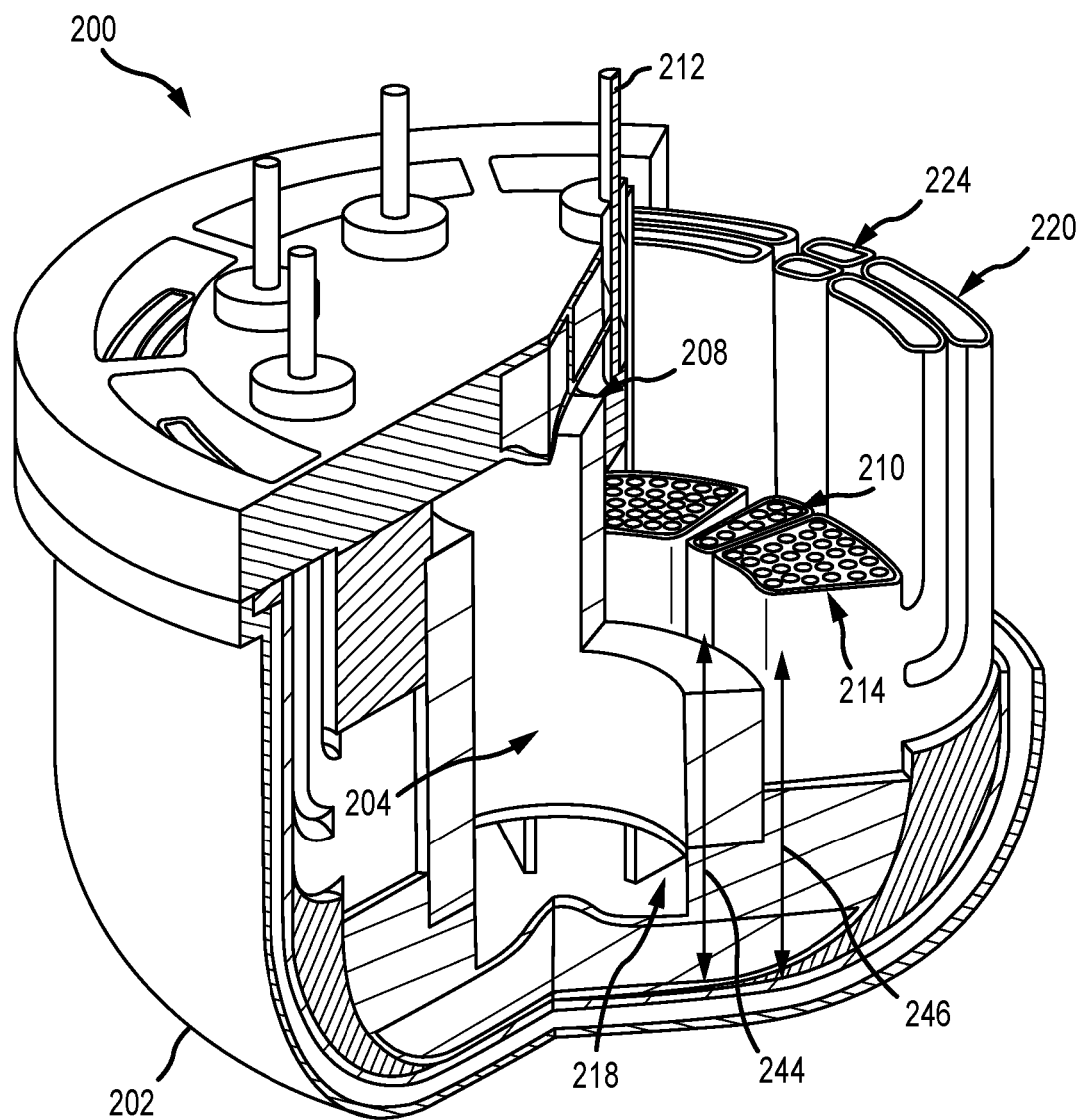
FIG. 11 is a sectional perspective view of the DHHX configuration shown in FIG. 10.

FIG. 10 depicts, schematically, another configuration of a DHHX in a molten fuel reactor 200. FIG. 11 is a sectional perspective view of the DHHX configuration shown in FIG. 10. Certain components are depicted above and, as such, are not necessarily described further. Referring concurrently to FIGS. 10 and 11, components disposed outside the vessel 202 are not depicted, but the various coolant circuits 220, 224 may be any of those depicted in the above figures, or other examples. In this example, the DHHX 210 and the PHX 214 in the reactor 200 are arranged in a parallel configuration and disposed adjacent to one another, where flow 206 from the pump 212 is split after the discharge therefrom. That is, the DHHX 210 is disposed a DHHX distance 244 above a bottom portion of the vessel 202 and the DHHX distance 244 is substantially equal to a PHX distance 246 of the PHX 214 positioned above the bottom portion. As such, a portion of the total volume flows directed through the DHHX 210 from the pump 212 (thus, the flow is active), and another portion of the total volume flows through the PHX 214.

The placement of the DHHX 210 may be based at least partially on the size and space required for operation of the pump 212 and/or the PHX 214. As such, in this example, the DHHX 210 is adjacent to the PHX 214, while in other examples, (e.g., FIGS. 8 and 9) the DHHX 210 is adjacent to the pump 212 and independent from the PHX 214. However, the coolant circuits may be any of those depicted herein.

Figure 12:
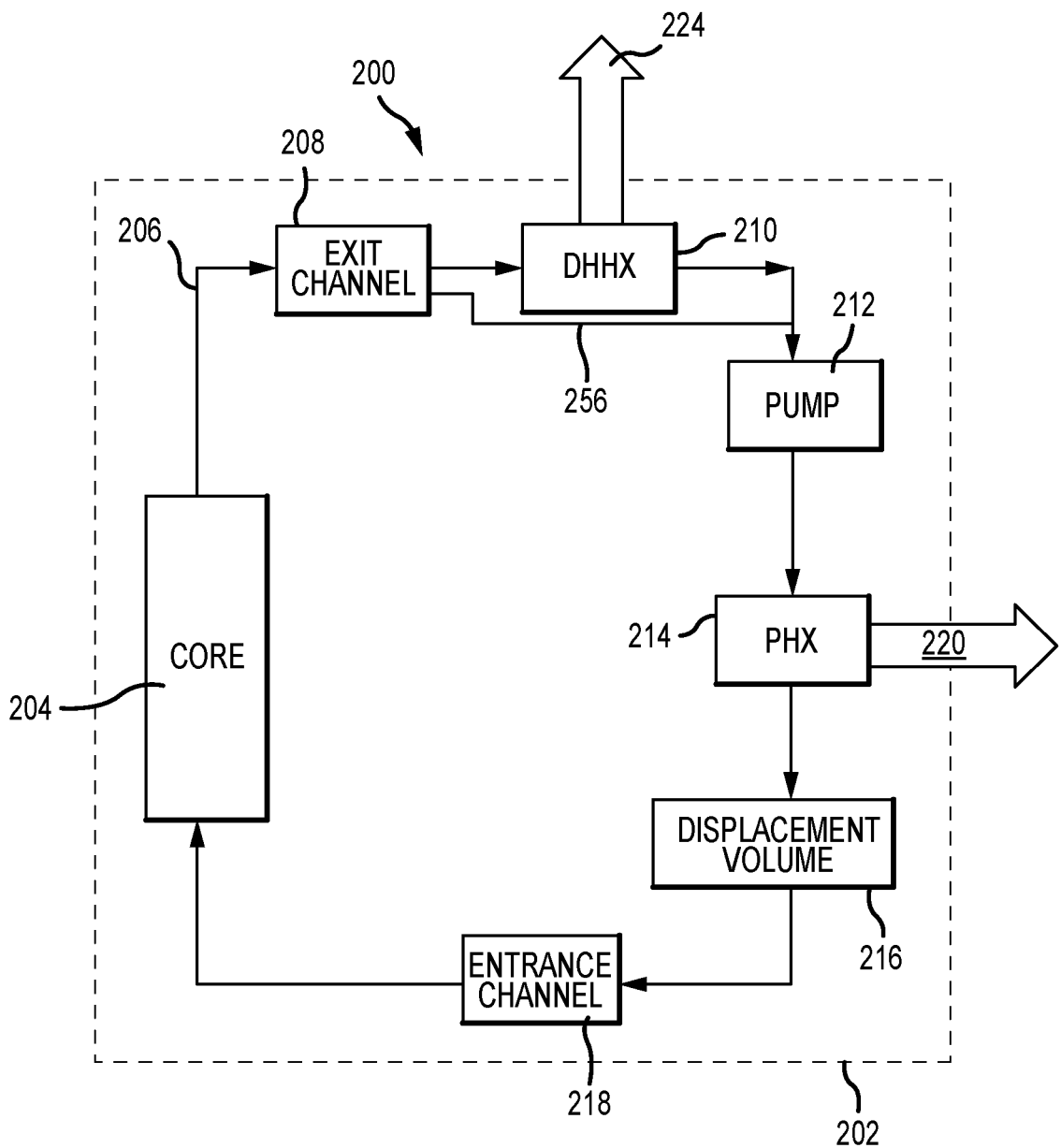
FIG. 12 depicts, schematically, another configuration of a DHHX in a molten fuel reactor.

FIG. 12 depicts, schematically, another configuration of a DHHX in a molten fuel reactor 200. Certain components are described in the above figures and, as such, are not necessarily described further. Components disposed outside the vessel 202 are not depicted, but the various coolant circuits 220, 224 may be any of those depicted in the above figures, or other examples. In this example, the DHHX 210 is disposed within the exit channel 208 and within the molten fuel flow path 206 between the core 204 and the pump 212. However, the DHHX 210 may be disposed within the exit channel 208 such that it does not receive all of the molten fuel salt flow 206 passing through the exit channel 208. In that regard, a bypass 256 is formed such that only a portion of the flow 206 may be drawn through the DHHX 210. The head of the pump 212, configuration of the various flow channels, and configuration of the DHHX 210 may affect how much flow 206 flows through the bypass 256. As the DHHX 210 is only partially within the direct path 206 of the molten fuel salt induced by the pump 212, this configuration may be referred to as a hybrid configuration.

In alternative examples, the bypass 256 may initially be blocked by frozen fuel salt during normal operation. Initial decay heat can be absorbed by phase change (e.g., melting) of the frozen fuel salt and long-time decay heat removal can be through fuel salt flow through the bypass 256 and the DHHX 210.

Figure 13:
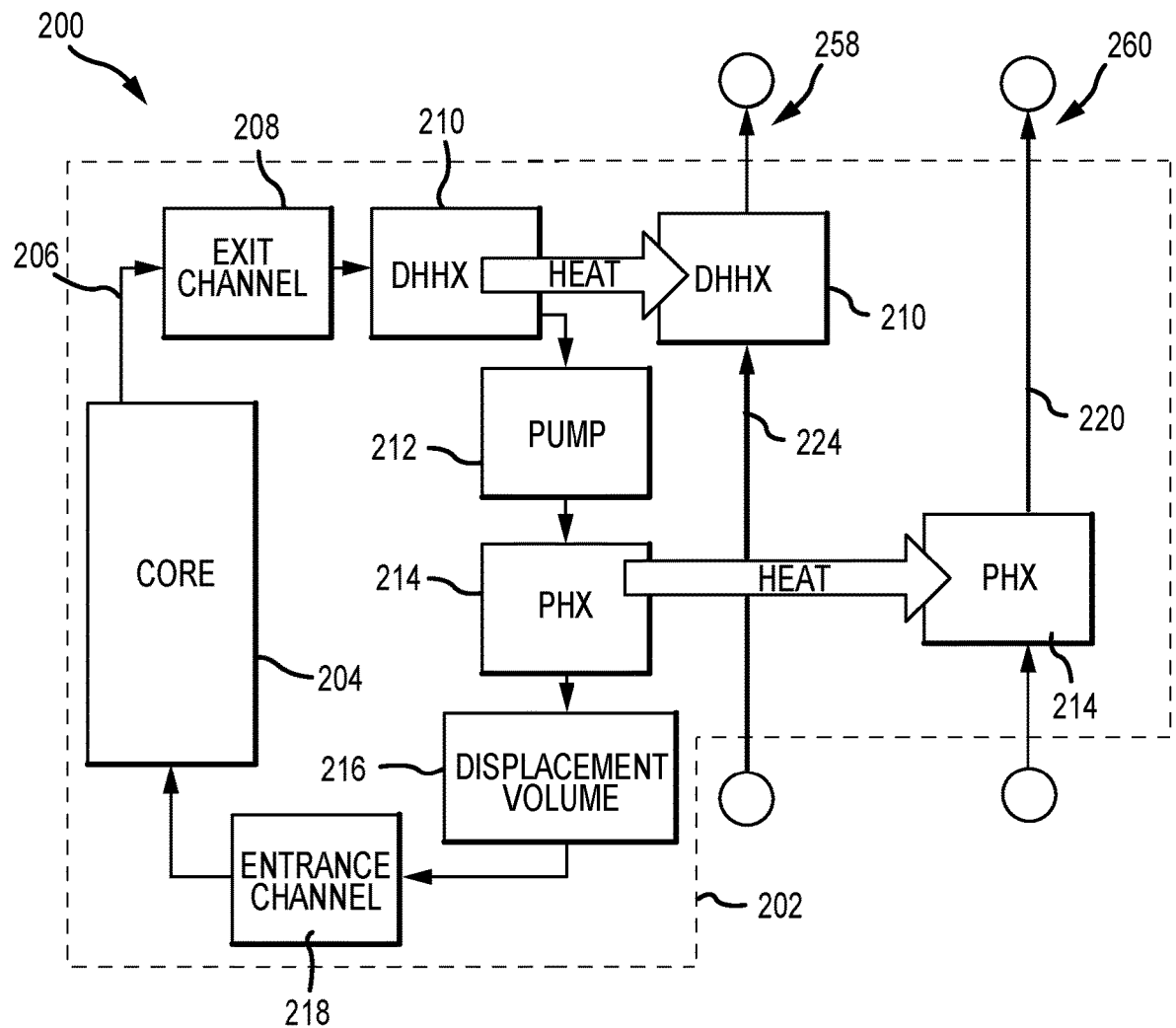
FIG. 13 depicts, schematically, another configuration of a DHHX in a molten fuel reactor.

FIG. 13 depicts, schematically, another configuration of a DHHX in a molten fuel reactor 200. Certain components are depicted above and, as such, are not necessarily described further. In this example, the configuration of the DHHX 210 is similar to that depicted in FIG. 3 and the DHHX 210 is disposed within the exit channel 208. The pump 212 is downstream of the DHHX and upstream of the PHX 214 relative to the fuel salt flow 206, and as such, the DHHX is serial (as relates to the PHX and pump) and active flow (as relates to molten salt fuel flow directly induced by the pump).

Additionally, in this example, the configuration of the primary coolant loop 220 and the DRACS coolant loop 224 are similar to that depicted in FIG. 6 and PHX 214 and the DHHX 210 are each connected to dedicated and independent flow circuits 260, 258, respectively. Each circuit 258, 260 includes separate coolant loops with pumps, although in some examples, the DRACS circuit 258 may not include pumps and is configured to naturally circulate. In other examples, one or more of the circuits 258, 260 may include a plurality of coolant loops and external heat exchangers as required or desired. By using discrete and independent circuits, different coolant fluid with different thermal-fluid properties may be used in each circuit so as to increase heat removal performance and efficiencies, and to provide system redundancies and protect reactor operations. For example, a molten salt with a lower melting temperature may be beneficial for use in the DRACS circuit 258. In other examples, the DRACS circuit 258 may include other coolant fluids, such as, but not limited to, liquid metals, air, etc. as required or desired. Also, the piping of the discrete circuits 258, 260 may be sized for a single function (e.g., decay heat removal). Additionally, by using discrete circuits, the thermal mass of the DRACS circuit 258 may be reduced so as to facilitate a faster cooling response. In one example, the heat removed from the DRACS coolant loop 224 may be channeled, via one or more DRACS circuits 258, to a steam generator (not shown).

Figure 14:
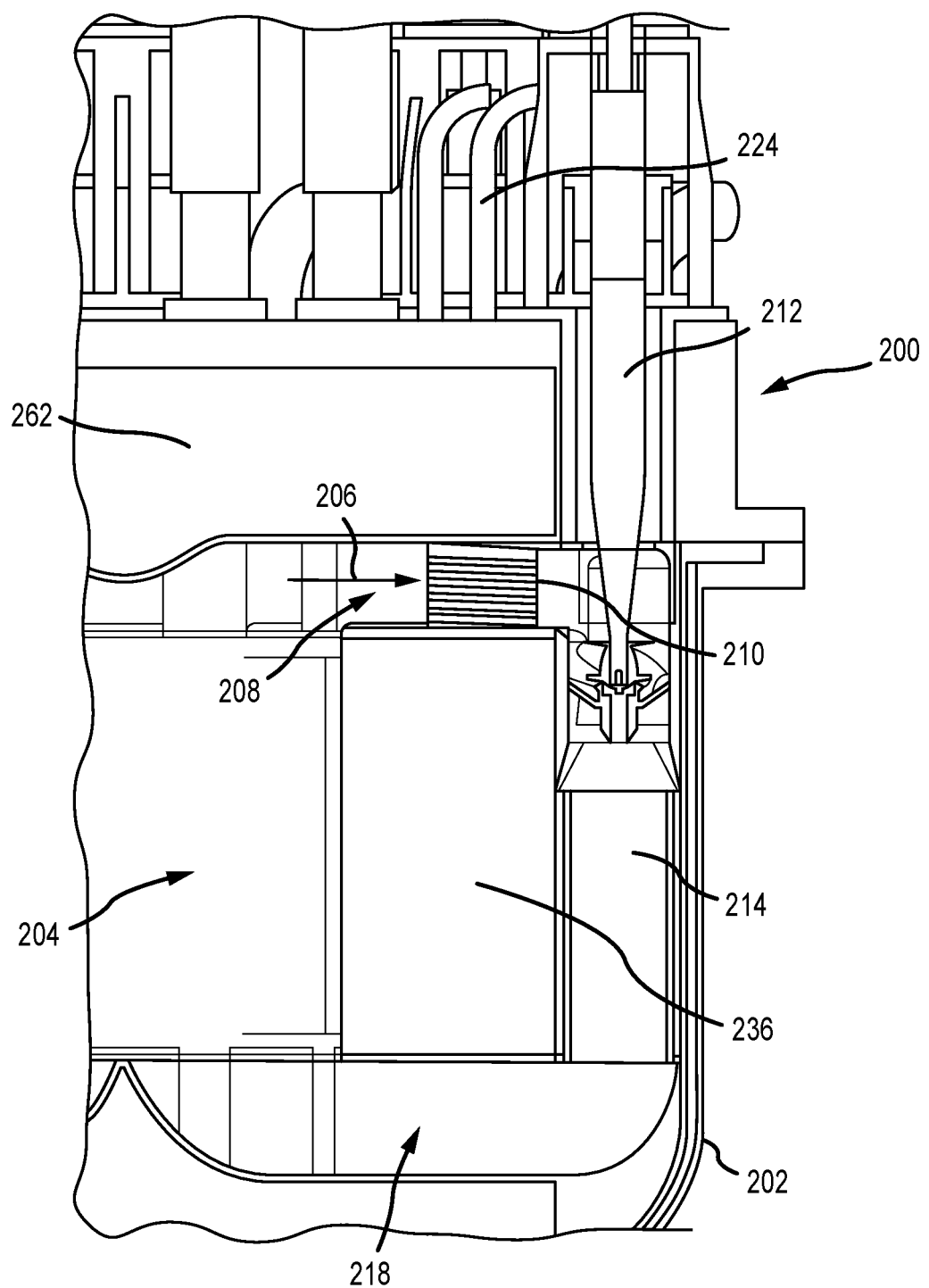
FIG. 14 is a side elevation view of the DHHX configuration shown in FIG. 13.

FIG. 14 is a side elevation view of the DHHX configuration shown in FIG. 13. Certain components are depicted above and, as such are not described further, additionally, components disposed outside the vessel 202 are not depicted, but the various coolant circuits may be any of those described herein, or any others as required or desired. In this example, the DHHX 210 is disposed within the exit channel 208 and within the direct molten fuel flow path 206 between the core 204 and the pump 212. The exit channel 208 is between a vessel head 262 and the top of the reflector 236 that at least partially forms the core 204. As such, fuel salt flow through the exit channel 208 is substantially horizontal in the vessel 202. In the example, the DHHX 210 is a single path cross-flow shell and tube heat exchanger with the shell carrying the coolant flow and the tubes carrying the fuel salt flow. The DHHX 210 may extend across the entire exit channel 208.

Figure 15:
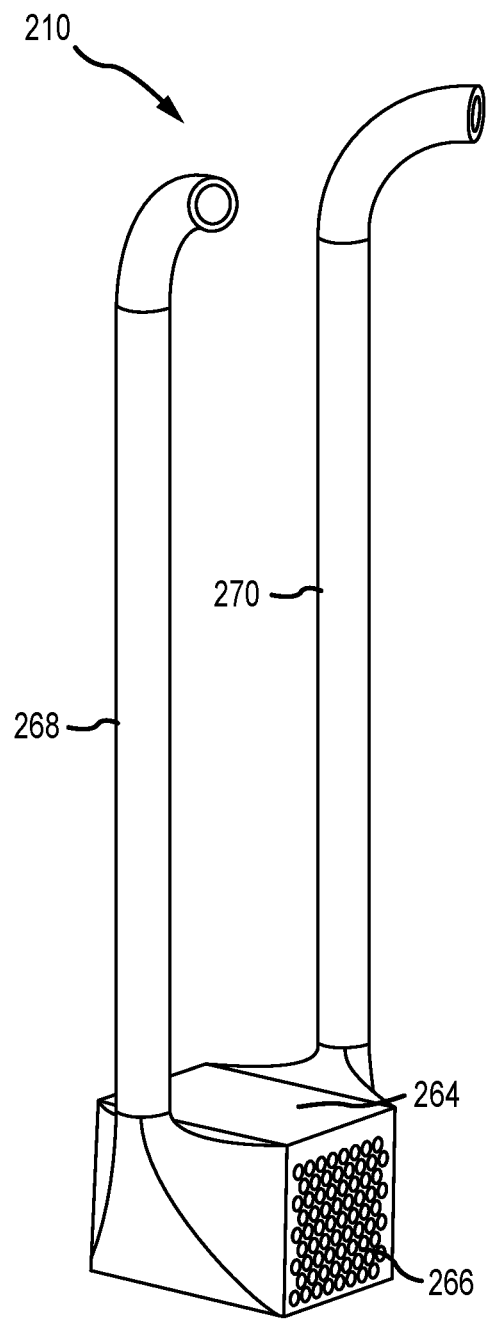
FIG. 15 is a perspective view of a DHHX shown in FIG. 14.
Figure 16:
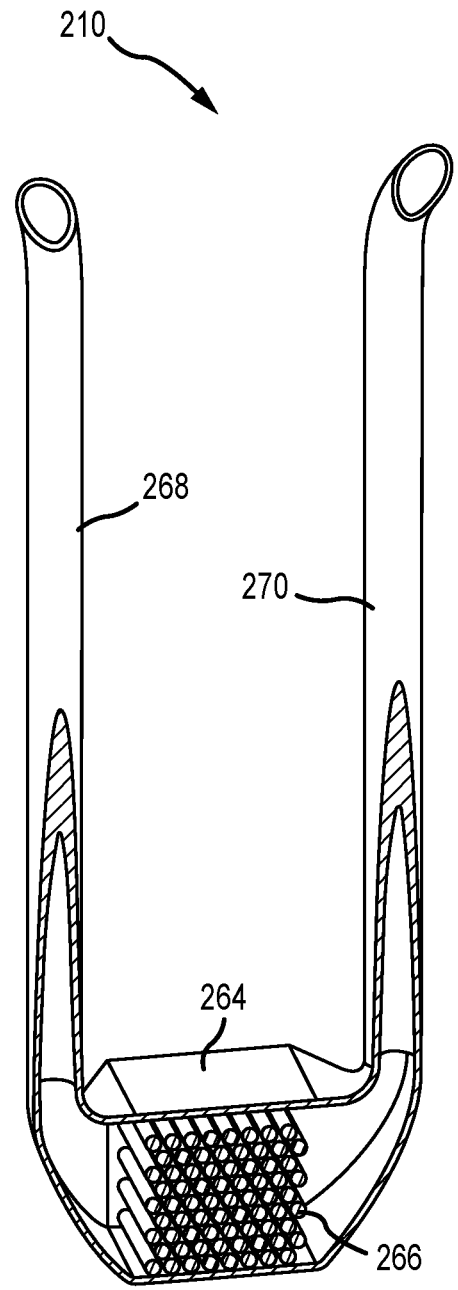
FIG. 16 is a sectional perspective view of the DHHX shown in FIG. 14.

FIG. 15 is a perspective view of the DHHX 210 shown in FIG. 14. FIG. 16 is a sectional perspective view of the DHHX 210. Referring concurrently to FIGS. 15 and 16, the DHHX 210 is a shell and tube heat exchanger that has a shell 264 sized and shaped to fit within the exit channel 208 (shown in FIG. 14). A plurality of tubes 266 (referred to as the tubeset or tube bundles) horizontally extend through the shell 264 and are substantially parallel to the exit channel 208. In some examples, one or more of the tubes 266 may be angled and/or curved to act as a flow straightening device and straighten the flow of the fuel salt flow as it is channeled through the exit channel as described further above and to reduce pump cavitation. The shell 264 may include an inlet 268 and an outlet 270 such that coolant (e.g., molten salts, liquid metals, air, etc.) can circulate through the DHHX 210 and facilitate heat removal from the fuel salt. The inlet 268 and the outlet 270 may be elongated so as to extend through the vessel head 262 (shown in FIG. 14).

Figure 17:
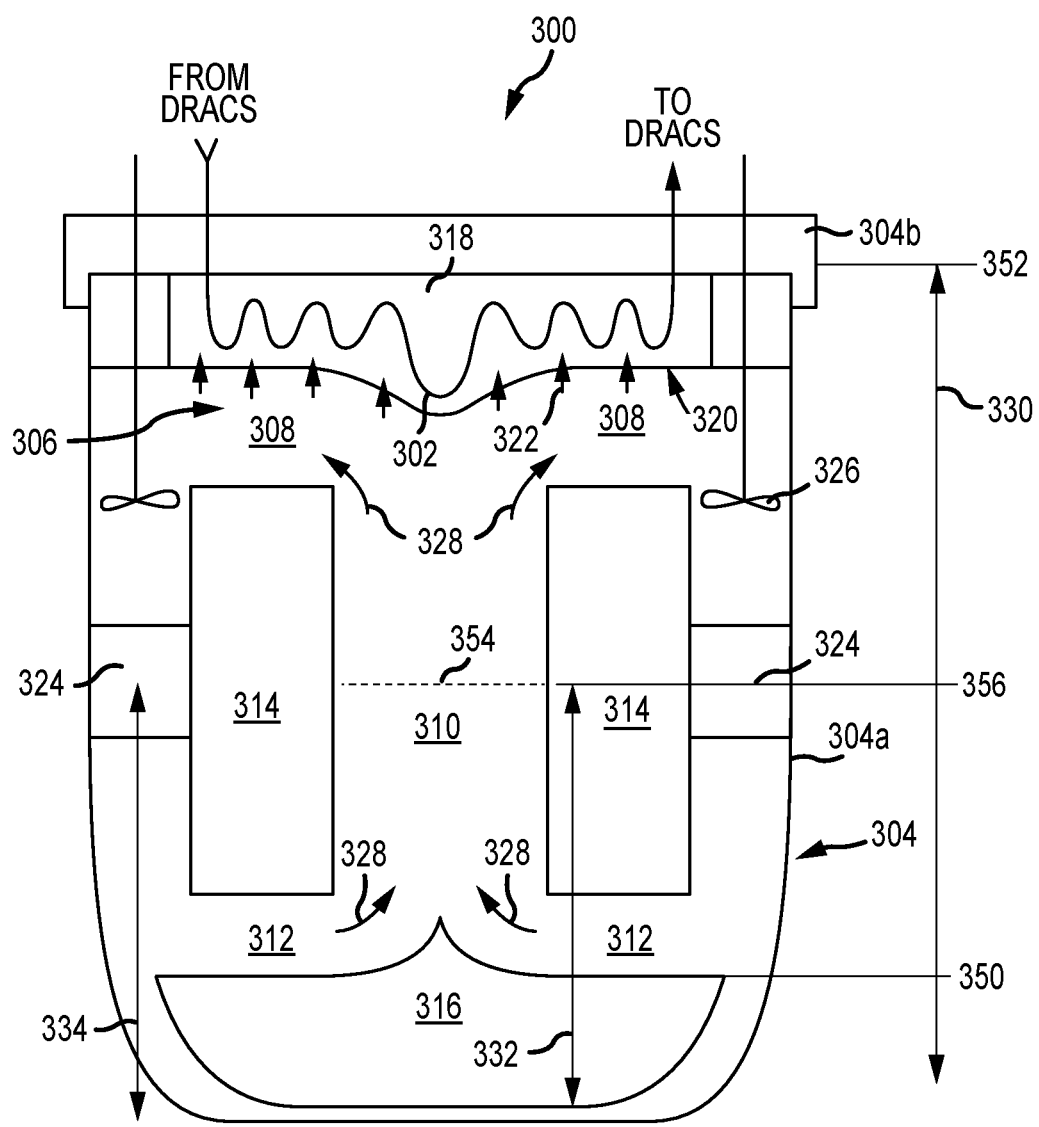
FIG. 17 is a side-sectional view of another configuration of a DHHX in a molten fuel reactor.

FIG. 17 is a side-sectional view of another configuration of a DHHX 302 in a molten fuel reactor 300. In this example the DHHX 302 is a heat exchanger that is positioned in the top reflector and receives a passive flow of the fuel salt from the reactor core. Additional details of the reactor 300 are also depicted. A vessel 304 includes a vessel portion 304a and sealed by a vessel head 304b contains the various components of the reactor 300 within an interior 306 thereof. The vessel portion 304a defines in part a bottom portion of the vessel 304 and the vessel head 304b defines a head portion of the vessel 304. The head portion is disposed a head distance 330 above the bottom portion that corresponds to the length of the sidewalls of the vessel portion 304a and which forms the interior 306. In the sectional view depicted in FIG. 17, a flow channel is depicted as having two outlet channels 308 that extend away from an upper portion of a core 310, along with two inlet channels 312 that are connected to a lower portion of the core 310.

Additional outlet and inlet channels are not depicted, but may be circumferentially spaced and radiate from the substantially cylindrical central core 310 out towards outer walls of the vessel portion 304a. In examples, a total of four flow channels (each including an outlet channel 308 and an inlet channel 312) are utilized. In other examples, six, eight, or ten or more channels may be utilized, although odd numbers may also be utilized.

A number of reflectors form the various channels 308, 312 and the core 310 of the reactor 300. For example, a plurality of vertical reflectors 314 surrounds the core 310. Although the construction of such reflectors 314 may differ as required or desired for a particular application, the vertical reflectors 314 form an annulus to reflect energy back into the core 310. A lower reflector 316 is disposed below the core 310 and extends outwards towards the walls of the vessel 304 so as to at least partially form (along with the vertical reflectors 314) the inlet channels 312. Although a single lower reflector 316 is depicted, the reflector 316 may be made of more than a single component, arranged as required to form the desired channels 312. An upper reflector 318 is disposed above the reactor core 310 and, in examples, extends outward towards the walls of the vessel portion 304a. The vessel head 304b is disposed above the upper reflector 318. The core 310, defined by the reflectors, is disposed within the interior 306 a central core distance 332 above the bottom portion, and the central core distance 332 is less than the head distance 330.

In the example depicted in FIG. 17, the DHHX 302 is incorporated into an upper reflector 318. In examples, a lower surface 320 of the upper reflector 318 may include features that enable that component to be utilized as both the reflector 318 and the DHHX 302. In the depicted example, the lower surface 320 may define a number of openings 322 into which the molten fuel salt may be introduced due to the natural rising of the high temperature salt from the core 310. Thus, when incorporated into the upper reflector 318, the DHHX 302 may be considered to receive a passive flow of fuel salt. Additionally, the openings 322 form additional surface area for heat transfer between the fuel salt and the upper reflector 318.

In alternative examples, the openings 322 may initially be blocked and/or filled by frozen fuel salt during normal operation. Initial decay heat can be absorbed by phase change (e.g., melting) of the frozen fuel salt and long-time decay heat removal can be through fuel salt flow through the openings 322 and heat transfer through the DHHX 302.

Further components of the reactor 300 are depicted in FIG. 17. A PHX 324 is disposed in the vessel 304, shielded from the core 310 by the reflector 314. The PHX 324 is positioned within the interior 306 a PHX distance 334 above the bottom portion, and the PHX distance 334 is less than the head distance 330. In some examples, the PHX distance 334 is substantially equal to or greater than the central core distance 332. An impeller or pump 326 circulates the molten fuel salt though each flow channel, in the direction indicated by arrows 328. The flow direction 328 defines the outlet channels 308 as being downstream of the core 310 and the inlet channels 312 as being upstream of the core 310. In another example, however, flow may be in the opposite direction (e.g., such that the pump 326 draws the molten fuel salt in an upwards direction through the PHX 324).

Relative positions of the various components within the vessel can also have an effect on performance of the DHHX 302. The vessel 304 containing the molten fuel salt includes a lower extent 350 characterized by the lowest location in the vessel in which molten fuel salt is present. This is, in most cases, the lowest point of the inlet channels 312. An upper extent 352 (that is, the highest location of the molten fuel salt) is generally located at the underside of the vessel head 304b. A geometric center plane 354 of the core, generally the location within the core 310 where the most heat is generated, is also depicted. The elevation 356 of the geometric center 354 is also depicted. Due to the flow direction 328 of the molten fuel salt through the core 310 and the position of the PHX 324, the fuel salt has a higher temperature as it is channeled through the outlet channels 308 than when it is channeled through the inlet channels 312. As such, the DHHX 302 is positioned above the elevation 356 of the geometric center 354 so as to increase the buoyant driving force and extract a greater amount of decay heat from the reactor 300.

By positioning the DHHX 302 within the higher temperature flow areas of the reactor 300, the efficiency of the DHHX 302 and the reactor 300 overall is increased. Additionally, by positioning the DHHX 302 above the geometric center 354 of the reactor 300, upon a reactor shutdown event (e.g., a planned reactor shutdown or an unplanned loss of forced flow in the fuel salt circuit) decay heat will rise within the reactor 300 and proximate to the DHHX 302 for a more efficient heat removal system.

In addition to those described above, further examples are disclosed in the following numbered clauses:

1. A molten chloride fast reactor (MCFR) comprising:
a plurality of reflectors defining a central core, wherein the central core includes a core geometric center;
a flow channel fluidically connected to the central core, wherein the flow channel includes an outlet flow channel downstream of the central core and an inlet flow channel upstream from the central core;
a primary heat exchanger (PHX) disposed outside the central core and between the outlet flow channel and the inlet flow channel; and
a decay heat heat exchanger (DHHX), wherein at least a portion of the DHHX is disposed above the core geometric center, and wherein a fuel salt is configured to circulate at least partially through the outlet flow channel, the DHHX, the PHX, the inlet flow channel, and the central core.

2. The MCFR of clause 1 or any clause that depends from clause 1, wherein the DHHX is disposed upstream from the PHX.

3. The MCFR of clause 1 or any clause that depends from clause 1, further comprising a pump for circulating the fuel salt, wherein the DHHX is disposed upstream from the pump.

4. The MCFR of clause 3 or any clause that depends from clause 3, wherein the pump is disposed upstream from the PHX.

5. The MCFR of clause 3 or any clause that depends from clause 3, wherein a flow direction of the fuel salt through the DHHX is different than a flow direction of the fuel salt through the pump.

6. The MCFR of clause 1 or any clause that depends from clause 1, further comprising a flow conditioner disposed at least partially in the outlet flow channel.

7. The MCFR of clause 6, wherein the DHHX includes the flow conditioner.

8. The MCFR of clause 1 or any clause that depends from clause 1, wherein the DHHX includes a shell and a plurality of tubes.

9. The MCFR of clause 8, wherein the plurality of tubes are disposed substantially parallel to the outlet flow channel.

10. The MCFR of clause 1 or any clause that depends from clause 1, further comprising a cooling circuit including the DHHX, wherein a coolant fluid is configured to circulate through the cooling circuit and remove heat from the fuel salt.

11. The MCFR of clause 10 or any clause that depends from clause 10, wherein the cooling circuit is devoid of a circulating pump.

12. The MCFR of clause 10 or any clause that depends from clause 10, wherein a flow of the coolant fluid through the DHHX is substantially orthogonal to a flow of the fuel salt through the DHHX.

13. The MCFR of clause 10 or any clause that depends from clause 10, wherein the cooling circuit is a first cooling circuit, and further comprising a second cooling circuit including the PHX, wherein the first cooling circuit is independent from the second cooling circuit.

14. A molten chloride fast reactor (MCFR) comprising:
a vessel including a plurality of structures disposed therein and defining at least one flow channel for circulating fuel salt within the vessel;
a core geometric center defined within the vessel; and
a decay heat heat exchanger (DHHX) disposed within the vessel and at least partially above the core geometric center.

15. The MCFR of clause 14 or any clause that depends from clause 10, wherein the DHHX is coupled in flow communication to at least one cooling circuit that removes heat from the fuel salt.

16. The MCFR of clause 14 or any clause that depends from clause 10, further comprising a primary heat exchanger (PHX) disposed within the vessel, wherein the DHHX is upstream of the PHX relative the circulation of fuel salt.

17. A direct reactor auxiliary cooling system (DRACS) for a molten chloride fast reactor (MCFR), the DRACS comprising:
a decay heat heat exchanger (DHHX) disposed within a MCFR reactor vessel and at least partially above a core geometric center, wherein the DHHX includes a shell and a plurality of tubes, and wherein the plurality of tubes receive a flow of fuel salt within the MCFR reactor vessel; and
a cooling circuit coupled in flow communication with the shell and configured to circulate a coolant fluid therein.

18. The DRACS of clause 17 or any clause that depends from clause 17, further comprising a second heat exchanger coupled in flow communication with the cooling circuit, wherein the second heat exchanger is positioned at a height that is greater than a height of the DHHX.

19. The DRACS of clause 18, wherein the second heat exchanger receives a flow of air to remove heat from the coolant fluid.

20. The DRACS of clause 17 or any clause that depends from clause 17, further comprising a flow conditioner.

21. A molten chloride fast reactor (MCFR) comprising:
a plurality of reflectors defining a central core, wherein the central core includes a core geometric center;
a flow channel fluidically connected to the central core, wherein the flow channel includes an outlet flow channel downstream of the central core and an inlet flow channel upstream from the central core;
a primary heat exchanger (PHX) disposed outside the central core and between the outlet flow channel and the inlet flow channel;
a pump for circulating a fuel salt through the outlet flow channel, the primary heat exchanger, the inlet flow channel, and the central core;
a decay heat heat exchanger (DHHX), wherein at least a portion of the DHHX is disposed above the core geometric center; and
a flow conditioner disposed in the outlet flow channel and upstream of the pump.

22. The MCFR of clause 21 or any clause that depends from clause 21, wherein the DHHX is disposed upstream from the PHX.

23. The MCFR of clause 21 or any clause that depends from clause 21, wherein the DHHX is disposed upstream from the pump.

24. The MCFR of clause 23, wherein the pump is disposed upstream from the PHX.

25. The MCFR of clause 21 or any clause that depends from clause 21, wherein the DHHX is the flow conditioner.

26. The MCFR of clause 21 or any clause that depends from clause 21, wherein the plurality of reflectors at least partially define the flow conditioner.

27. The MCFR of clause 21 or any clause that depends from clause 21, wherein the DHHX is disposed in the outlet flow channel, and wherein the outlet flow channel at least partially includes a DHHX bypass.

28. The MCFR of clause 21 or any clause that depends from clause 21, wherein the MCFR includes a reflector of the plurality of reflectors disposed proximate the outlet flow channel.

29. The MCFR of clause 28, wherein the DHHX is disposed within the reflector.

30. The MCFR of clause 21 or any clause that depends from clause 21, wherein the DHHX is disposed downstream of the pump.

31. The MCFR of clause 30 or any clause that depends from clause 30, wherein the DHHX is disposed upstream of the PHX.

32. The MCFR of clause 30 or any clause that depends from clause 30, wherein the DHHX is disposed adjacent the PHX, such that a volume of the fuel salt passes through only one of the DHHX and the PHX.

33. The MCFR of clause 31, wherein the DHHX is disposed so as to define a DHHX bypass.

34. The MCFR of clause 21 or any clause that depends from clause 21, wherein the PHX is disposed opposite at least one reflector of the plurality of reflectors from the central core.

35. The MCFR of clause 21 or any clause that depends from clause 21, further comprising a vessel and a plurality of structures disposed therein and defining the flow channel.

36. The MCFR of clause 35 or any clause that depends from clause 35, wherein the plurality of reflectors, the pump, the PHX, and the DHHX are disposed in the vessel.

37. The MCFR of clause 35 or any clause that depends from clause 35, wherein the vessel includes a bottom portion and a head disposed a head distance above the bottom portion.

38. The MCFR of clause 37, wherein the central core is disposed a central core distance above the bottom portion, wherein the central core distance is less than the head distance.

39. The MCFR of clause 38 or any clause that depends from clause 38, wherein the PHX is disposed a PHX distance above the bottom portion.

40. The MCFR of clause 39 or any clause that depends from clause 39, wherein the PHX distance is substantially equal to the central core distance.

41. The MCFR of clause 39 or any clause that depends from clause 39, wherein the PHX distance is greater than the central core distance.

42. The MCFR of clause 38 or any clause that depends from clause 38, wherein the DHHX is disposed a DHHX distance above the bottom portion.

43. The MCFR of clause 42 or any clause that depends from clause 42, wherein the DHHX distance is greater than the PHX distance.

44. The MCFR of clause 42 or any clause that depends from clause 42, wherein the DHHX distance is substantially equal to the PHX distance.

45. The MCFR of clause 21 or any clause that depends from clause 21, wherein a flow direction of the fuel salt through the DHHX is substantially similar to a flow direction of the fuel salt through the pump.

46. The MCFR of clause 45 or any clause that depends from clause 45, wherein the flow direction of the fuel salt through the DHHX is substantially vertical.

47. The MCFR of clause 45 or any clause that depends from clause 45, wherein the flow direction of the fuel salt through the DHHX is primarily horizontal.

48. The MCFR of clause 21 or any clause that depends from clause 21, wherein a flow direction of the fuel salt through the DHHX is different than a flow direction of the fuel salt through the pump.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A molten chloride fast reactor (MCFR) comprising:
   a plurality of reflectors defining a central core, wherein the central core includes a first end, an opposite second end, and a core geometric center disposed therebetween;
   a flow channel fluidically connected to the central core, wherein the flow channel includes an outlet flow channel positioned proximate the second end of the central core and an inlet flow channel positioned proximate the first end of the central core;
   a primary heat exchanger (PHX) disposed outside the central core and within the flow channel between the outlet flow channel and the inlet flow channel;
   a pump disposed within the flow channel between the PHX and the outlet flow channel; and
   a decay heat heat exchanger (DHHX) disposed within the flow channel between the outlet flow channel and the pump, wherein at least a portion of the DHHX is disposed above the core geometric center, and wherein a fuel salt is configured to circulate via the pump at least partially through the outlet flow channel, the DHHX, the PHX, the inlet flow channel, and the central core in a direction such that at the first end of the central core the fuel salt has a lower temperature than the fuel salt at the second end of the central core.

2. The MCFR of claim 1 wherein a flow direction of the fuel salt through the DHHX is different than a flow direction of the fuel salt through the pump.

3. The MCFR of claim 1, further comprising a flow conditioner disposed at least partially in the outlet flow channel.

4. The MCFR of claim 3, wherein the DHHX includes the flow conditioner.

5. The MCFR of claim 1, wherein the DHHX includes a shell and a plurality of tubes.

6. The MCFR of claim 5, wherein one or more of the plurality of tubes extend horizontally through the shell and angled downwardly relative to horizontal.

7. The MCFR of claim 1, further comprising a cooling circuit including the DHHX, wherein a coolant fluid is configured to circulate through the cooling circuit and remove heat from the fuel salt.

8. The MCFR of claim 7, wherein the cooling circuit is devoid of a circulating pump.

9. The MCFR of claim 7, wherein a flow of the coolant fluid through the DHHX is substantially orthogonal to a flow of the fuel salt through the DHHX.

10. The MCFR of claim 7, wherein the cooling circuit is a first cooling circuit, and further comprising a second cooling circuit including the PHX, wherein the first cooling circuit is independent from the second cooling circuit.

11. A molten chloride fast reactor (MCFR) comprising:
a vessel including a plurality of structures disposed therein and defining at least one flow channel for circulating fuel salt within the vessel;
a core geometric center defined within the vessel, wherein the circulating fuel salt is configured to pass through the core geometric center;
a primary heat exchanger (PHX) disposed within the vessel and within the at least one flow channel, wherein the PHX is oriented within the vessel such that the fuel salt flows along a vertical direction within the vessel through the PHX; and
a decay heat heat exchanger (DHHX) disposed within the vessel and within the at least one flow channel, wherein the DHHX is positioned at least partially above the core geometric center, and wherein the DHHX is oriented within the vessel such that the fuel salt flows along a horizontal direction within the vessel through the DHHX.

12. The MCFR of claim 11, wherein the DHHX is coupled in flow communication to at least one cooling circuit that removes heat from the fuel salt.

13. The MCFR of claim 11, wherein the DHHX is disposed between the core geometric center and the PHX within the at least one flow channel.

* * * * *